US011824974B2

(12) United States Patent
Zee et al.

(10) Patent No.: US 11,824,974 B2
(45) Date of Patent: *Nov. 21, 2023

(54) CHANNEL KEY LOADING IN A COMPUTING ENVIRONMENT

(71) Applicant: International Business Machines Corporation, Armonk, NY (US)

(72) Inventors: Mooheng Zee, Dutchess, NY (US); Richard Mark Sczepczenski, Hyde Park, NY (US); John R. Flanagan, Chapel Hill, NC (US); Christopher J. Colonna, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/476,677

(22) Filed: Sep. 16, 2021

(65) Prior Publication Data
US 2022/0006626 A1    Jan. 6, 2022

Related U.S. Application Data

(63) Continuation of application No. 16/801,319, filed on Feb. 26, 2020, now Pat. No. 11,184,160.

(51) Int. Cl.
H04L 9/08         (2006.01)
H04L 67/1097   (2022.01)
H04L 9/14         (2006.01)

(52) U.S. Cl.
CPC ............ *H04L 9/0844* (2013.01); *H04L 9/083* (2013.01); *H04L 9/0891* (2013.01); *H04L 9/14* (2013.01); *H04L 67/1097* (2013.01)

(58) Field of Classification Search
CPC ..... H04L 9/0844; H04L 9/083; H04L 9/0891; H04L 9/14; H04L 67/1097
See application file for complete search history.

(56) References Cited

U.S. PATENT DOCUMENTS 4,881,263 A    11/1989   Herbison et al.
5,235,644 A    8/1993    Gupta et al.
(Continued)

FOREIGN PATENT DOCUMENTS

CN    101212293 B    12/2006
CN    101662360 B    8/2008
(Continued)

OTHER PUBLICATIONS

Cisco, "Perfect forward secrecy for GETVPN", https://www.cisco.com/c/en/us/td/docs/ios-xml/ios/sec_conn_getvpn/configuration/xe-16-12/sec-get-vpn-xe-16-12-book/sec-get-vpn-pfs.html; Sep. 25, 2019; 8 pages.
(Continued)

*Primary Examiner* — Hee K Song
(74) *Attorney, Agent, or Firm* — CANTOR COLBURN LLP; Edward Wixted

(57) ABSTRACT

Aspects of the invention include channel key loading of a host bus adapter (HBA) based on a secure key exchange (SKE) authentication response by a responder node of a computing environment. A non-limiting example computer-implemented method includes receiving an authentication response message at an initiator channel on an initiator node from a responder channel on a responder node to establish a secure communication, the receiving at a local key manager (LKM) executing on the initiator node. A state check can be performed based on a security association of the initiator node and the responder node. An identifier of a selected encryption algorithm can be extracted from the authentication response message. The initiator channel can request to communicate with the responder channel based at least in part on a successful state check and the selected encryption algorithm.

20 Claims, 19 Drawing Sheets

(56) References Cited

U.S. PATENT DOCUMENTS

| | | |
|---|---|---|
| 5,293,029 A | 3/1994 | Iijima |
| 5,432,798 A | 7/1995 | Blair |
| 6,178,511 B1 | 1/2001 | Cohen et al. |
| 6,182,215 B1 | 1/2001 | Tatebayashi et al. |
| 6,240,512 B1 | 5/2001 | Fang et al. |
| 6,243,816 B1 | 6/2001 | Fang et al. |
| 6,263,435 B1 | 7/2001 | Dondeti et al. |
| 6,263,437 B1 | 7/2001 | Liao et al. |
| 6,275,944 B1 | 8/2001 | Kao et al. |
| 6,490,680 B1 | 12/2002 | Scheidt et al. |
| 6,636,968 B1 | 10/2003 | Rosner et al. |
| 6,661,896 B1 | 12/2003 | Barnett |
| 6,886,095 B1 | 4/2005 | Hind et al. |
| 6,915,434 B1 | 7/2005 | Kuroda et al. |
| 7,089,211 B1 | 8/2006 | Trostle et al. |
| 7,174,457 B1 | 2/2007 | England et al. |
| 7,362,868 B2 | 4/2008 | Madoukh et al. |
| 7,879,111 B2 | 2/2011 | Hardacker et al. |
| 7,899,189 B2 | 3/2011 | Dawson et al. |
| 8,156,231 B2 | 4/2012 | Bellifemine et al. |
| 8,200,868 B1 | 6/2012 | T' Hooft |
| 8,266,433 B1 | 9/2012 | Przykucki et al. |
| 8,391,494 B1 | 3/2013 | Serenyi |
| 8,401,195 B2 | 3/2013 | Fuchs et al. |
| 8,498,417 B1 | 7/2013 | Harwood et al. |
| 8,774,415 B2 | 7/2014 | Baba |
| 8,838,550 B1 | 9/2014 | Meaney |
| 8,908,863 B2 | 12/2014 | Chen et al. |
| 9,111,568 B2 | 8/2015 | Goodman et al. |
| 9,152,578 B1 | 10/2015 | Saad et al. |
| 9,185,088 B1 | 11/2015 | Bowen |
| 9,258,117 B1 | 2/2016 | Roth et al. |
| 9,299,385 B2 | 3/2016 | Carlson et al. |
| 9,519,696 B1 | 12/2016 | Roth et al. |
| 9,608,813 B1 | 3/2017 | Roth et al. |
| 9,654,469 B1 | 5/2017 | Yang |
| 9,774,445 B1 | 9/2017 | Gandhasri |
| 9,830,278 B1 | 11/2017 | Harwood et al. |
| 9,882,713 B1 | 1/2018 | Raza et al. |
| 9,887,975 B1 | 2/2018 | Gifford et al. |
| 9,942,034 B2 | 4/2018 | Le Saint et al. |
| 10,043,029 B2 | 8/2018 | Murray |
| 10,318,754 B2 | 6/2019 | Yavuz |
| 10,331,895 B1 | 6/2019 | Roth et al. |
| 10,333,696 B2 | 6/2019 | Ahmed |
| 10,361,859 B2 | 7/2019 | Clark et al. |
| 10,546,130 B1 | 1/2020 | Chaney |
| 10,678,938 B2 | 6/2020 | Agerstam et al. |
| 10,785,199 B1 | 9/2020 | Chhabra et al. |
| 10,817,875 B2 | 10/2020 | Makhotin et al. |
| 10,917,230 B2 | 2/2021 | Feng et al. |
| 11,184,160 B2 | 11/2021 | Zee et al. |
| 11,212,264 B1 | 12/2021 | Griffin et al. |
| 11,228,434 B2 | 1/2022 | Yankovskiy et al. |
| 2002/0095569 A1 | 7/2002 | Jerdonek |
| 2002/0154781 A1 | 10/2002 | Sowa |
| 2003/0026433 A1 | 2/2003 | Matt |
| 2003/0084336 A1 | 5/2003 | Anderson et al. |
| 2003/0126429 A1 | 7/2003 | Jinmei et al. |
| 2003/0196115 A1 | 10/2003 | Karp |
| 2003/0226013 A1 | 12/2003 | Dutertre |
| 2003/0229789 A1 | 12/2003 | Morais et al. |
| 2004/0103220 A1 | 5/2004 | Bostick et al. |
| 2004/0136533 A1 | 7/2004 | Takagaki et al. |
| 2004/0196979 A1 | 10/2004 | Cheng et al. |
| 2004/0210673 A1 | 10/2004 | Cruciani et al. |
| 2005/0027854 A1 | 2/2005 | Boulanger et al. |
| 2005/0078828 A1 | 4/2005 | Zheng |
| 2005/0135622 A1 | 6/2005 | Fors et al. |
| 2005/0136892 A1 | 6/2005 | Oesterling et al. |
| 2005/0174984 A1 | 8/2005 | O'Neill |
| 2006/0005237 A1 | 1/2006 | Kobata et al. |
| 2006/0010324 A1 | 1/2006 | Appenzeller et al. |
| 2006/0047601 A1 | 3/2006 | Peterka et al. |
| 2006/0129812 A1 | 6/2006 | Mody |
| 2007/0038679 A1 | 2/2007 | Ramkumar et al. |
| 2007/0104329 A1 | 5/2007 | England et al. |
| 2007/0127722 A1 | 6/2007 | Lam et al. |
| 2007/0218875 A1 | 9/2007 | Calhoun et al. |
| 2008/0063209 A1 | 3/2008 | Jaquette et al. |
| 2008/0075280 A1 | 3/2008 | Ye et al. |
| 2008/0095114 A1 | 4/2008 | Dutta et al. |
| 2008/0165973 A1 | 7/2008 | Miranda Gavillan et al. |
| 2008/0244174 A1 | 10/2008 | Abouelwafa et al. |
| 2008/0294906 A1 | 11/2008 | Chang et al. |
| 2009/0041006 A1 | 2/2009 | Chiu |
| 2009/0049311 A1 | 2/2009 | Carlson et al. |
| 2009/0067633 A1 | 3/2009 | Dawson et al. |
| 2009/0116647 A1 | 5/2009 | Korus et al. |
| 2009/0175451 A1 | 7/2009 | Greco |
| 2009/0316910 A1 | 12/2009 | Maeda et al. |
| 2010/0023781 A1 | 1/2010 | Nakamoto |
| 2010/0031045 A1 | 2/2010 | Gade et al. |
| 2010/0154053 A1 | 6/2010 | Dodgson et al. |
| 2010/0157889 A1 | 6/2010 | Aggarwal et al. |
| 2010/0161958 A1 | 6/2010 | Cho et al. |
| 2010/0246480 A1 | 9/2010 | Aggarwal et al. |
| 2010/0257372 A1 | 10/2010 | Seifert |
| 2010/0290624 A1 | 11/2010 | Buer et al. |
| 2011/0016314 A1 | 1/2011 | Hu et al. |
| 2011/0016322 A1 | 1/2011 | Dean et al. |
| 2011/0038477 A1 | 2/2011 | Bilodi |
| 2011/0150223 A1 | 6/2011 | Qi et al. |
| 2011/0179278 A1 | 7/2011 | Kim |
| 2011/0219438 A1 | 9/2011 | Maino et al. |
| 2011/0296186 A1 | 12/2011 | Wong et al. |
| 2011/0320706 A1 | 12/2011 | Nakajima |
| 2012/0030426 A1 | 2/2012 | Satran |
| 2012/0204032 A1 | 8/2012 | Wilkins et al. |
| 2013/0044878 A1 | 2/2013 | Rich et al. |
| 2013/0046972 A1 | 2/2013 | Campagna et al. |
| 2013/0103945 A1 | 4/2013 | Cannon |
| 2013/0132722 A1 | 5/2013 | Bennett et al. |
| 2013/0159706 A1 | 6/2013 | Li et al. |
| 2013/0191632 A1 | 7/2013 | Spector et al. |
| 2013/0198521 A1 | 8/2013 | Wu |
| 2013/0246813 A1 | 9/2013 | Mori et al. |
| 2013/0254531 A1 | 9/2013 | Liang et al. |
| 2013/0305040 A1 | 11/2013 | Lee et al. |
| 2014/0108789 A1 | 4/2014 | Phatak |
| 2014/0149740 A1 | 5/2014 | Sato et al. |
| 2014/0185805 A1 | 7/2014 | Andersen |
| 2014/0298037 A1 | 10/2014 | Xiao et al. |
| 2014/0380056 A1 | 12/2014 | Buckley et al. |
| 2015/0007262 A1 | 1/2015 | Aissi et al. |
| 2015/0019870 A1 | 1/2015 | Patnala et al. |
| 2015/0039883 A1 | 2/2015 | Yoon et al. |
| 2015/0044987 A1 | 2/2015 | Menon et al. |
| 2015/0058913 A1 | 2/2015 | Kandasamy et al. |
| 2015/0074409 A1 | 3/2015 | Reid et al. |
| 2015/0089241 A1 | 3/2015 | Zhao |
| 2015/0117639 A1 | 4/2015 | Feekes |
| 2015/0134971 A1 | 5/2015 | Park et al. |
| 2015/0281185 A1 | 10/2015 | Cooley |
| 2015/0302202 A1 | 10/2015 | Yamamoto |
| 2016/0065370 A1 | 3/2016 | Le Saint et al. |
| 2016/0099022 A1 | 4/2016 | Dover |
| 2016/0260087 A1 | 9/2016 | Lee et al. |
| 2016/0261407 A1 | 9/2016 | Hernandez et al. |
| 2016/0323275 A1 | 11/2016 | Choi et al. |
| 2017/0019380 A1 | 1/2017 | Dover |
| 2017/0118180 A1 | 4/2017 | Takahashi |
| 2017/0149740 A1 | 5/2017 | Mansour et al. |
| 2017/0171219 A1 | 6/2017 | Campagna |
| 2017/0264439 A1 | 9/2017 | Muhanna et al. |
| 2017/0337140 A1 | 11/2017 | Ragupathi et al. |
| 2017/0353450 A1 | 12/2017 | Koved et al. |
| 2018/0046586 A1 | 2/2018 | Venkatesh |
| 2018/0063141 A1 | 3/2018 | Kaliski, Jr. et al. |
| 2018/0083958 A1 | 3/2018 | Avilov et al. |
| 2018/0131517 A1 | 5/2018 | Block et al. |
| 2018/0212769 A1 | 7/2018 | Novak |
| 2018/0234409 A1 | 8/2018 | Nelson et al. |
| 2018/0241561 A1 | 8/2018 | Albertson et al. |

(56) References Cited

U.S. PATENT DOCUMENTS

| | | |
|---|---|---|
| 2018/0260125 A1 | 9/2018 | Botes et al. |
| 2018/0375870 A1 | 12/2018 | Bernsen |
| 2019/0018968 A1 | 1/2019 | Ronca et al. |
| 2019/0028437 A1 | 1/2019 | Law et al. |
| 2019/0068370 A1 | 2/2019 | Neerumalla |
| 2019/0132296 A1 | 5/2019 | Jiang et al. |
| 2019/0180028 A1 | 6/2019 | Seo |
| 2019/0181997 A1 | 6/2019 | Zhao et al. |
| 2019/0182240 A1 | 6/2019 | Rossi |
| 2019/0207927 A1 | 7/2019 | Lakhani et al. |
| 2019/0238323 A1 | 8/2019 | Bunch et al. |
| 2019/0268335 A1 | 8/2019 | Targali |
| 2019/0318102 A1 | 10/2019 | Araya et al. |
| 2019/0335551 A1 | 10/2019 | Williams et al. |
| 2019/0349759 A1 | 11/2019 | Rosenberg et al. |
| 2019/0380029 A1 | 12/2019 | Xu |
| 2020/0034528 A1 | 1/2020 | Yang et al. |
| 2020/0067907 A1 | 2/2020 | Avetisov et al. |
| 2020/0076585 A1 | 3/2020 | Sheppard et al. |
| 2020/0076600 A1 | 3/2020 | Driever et al. |
| 2020/0119911 A1 | 4/2020 | Shemer et al. |
| 2020/0136822 A1 | 4/2020 | Vallapakkam et al. |
| 2020/0204991 A1 | 6/2020 | Parry et al. |
| 2020/0205067 A1 | 6/2020 | Liu et al. |
| 2020/0233963 A1 | 7/2020 | Hamamoto et al. |
| 2020/0274870 A1 | 8/2020 | Zinar et al. |
| 2020/0275274 A1 | 8/2020 | Kwon et al. |
| 2020/0280548 A1 | 9/2020 | Toonk et al. |
| 2020/0304292 A1 | 9/2020 | Mochalov |
| 2021/0075621 A1* | 3/2021 | Hathorn ............... H04L 9/3297 |
| 2021/0075627 A1* | 3/2021 | Hathorn ............. H04L 63/0869 |
| 2021/0091943 A1* | 3/2021 | Hathorn ............... H04L 9/0894 |
| 2021/0091944 A1* | 3/2021 | Hathorn ............. H04W 12/069 |
| 2021/0168138 A1 | 6/2021 | Paruchuri |
| 2021/0203498 A1 | 7/2021 | Shin et al. |
| 2021/0209201 A1 | 7/2021 | Ge et al. |
| 2021/0218555 A1 | 7/2021 | Mastenbrook et al. |
| 2021/0266147 A1 | 8/2021 | Zee et al. |
| 2021/0266152 A1 | 8/2021 | Sczepczenski et al. |
| 2021/0266154 A1 | 8/2021 | Sczepczenski et al. |
| 2021/0266156 A1 | 8/2021 | Zee et al. |
| 2021/0266161 A1 | 8/2021 | Zee et al. |
| 2021/0266177 A1 | 8/2021 | Sczepczenski et al. |
| 2021/0266304 A1 | 8/2021 | Zee et al. |
| 2021/0336966 A1 | 10/2021 | Gujarathi et al. |
| 2021/0344645 A1 | 11/2021 | Vadayadiyil Raveendran et al. |
| 2021/0352047 A1 | 11/2021 | Singh et al. |

FOREIGN PATENT DOCUMENTS

| | | | |
|---|---|---|---|
| CN | 101409619 A | | 4/2009 |
| CN | 101436930 A | | 5/2009 |
| CN | 102546154 A | | 7/2012 |
| CN | 102821096 A | | 12/2012 |
| CN | 103716797 A | | 4/2014 |
| CN | 109246053 A | | 5/2017 |
| CN | 107046687 A | | 8/2017 |
| CN | 110446203 A | | 11/2019 |
| CN | 110690960 A | | 1/2020 |
| JP | 2006270363 A | * | 10/2006 |
| JP | 2006270363 A | | 10/2006 |
| JP | 2018182665 A | | 11/2018 |
| WO | 2007091002 A1 | | 8/2007 |
| WO | 2008155066 A2 | | 12/2008 |
| WO | WO-2008155066 A2 | * | 12/2008 ........... H04L 63/029 |
| WO | 2016016656 A1 | | 2/2016 |
| WO | 2016034453 A1 | | 3/2016 |
| WO | 2017167741 A1 | | 10/2017 |
| WO | 2018096449 A1 | | 5/2018 |
| WO | 2019133941 A1 | | 7/2019 |

OTHER PUBLICATIONS

DMTG, Security protocol and data model specification, retrieved from the internet: https://www.dmtf.org/sites/default/files/standards/documents/DSP0274_0.9.0a.pdf, May 30, 2019, 47 pages.

International Application No. PCT/IB2021/051287 International Search Report and Written Opinion dated May 21, 2021, 10 pages.

List of IBM Patents or Patent Appllictions Treated as Related; (Appendix P), Filed Sep. 16, 2021, 2 pages.

Patrick McDaniely et al., "Antigone: Implementing policy in secure group communication", http://www.eecs.umich.edu/techreports/cse/2000/CSE-TR-426-00.pdf; May 16, 2000; 33 pages.

Ran Canetti et al., Analysis of key-exchange protocols and their use for building secure channels:, https://link.springer.com/content/pdf/10.1007/3-540-44987-6_28.pdf , 2001, 22 pages.

Robert Friend et al., "Securing fibre channel sans with end-to-end encryption", Aug. 6, 2019, https://fibrechannel.org/wp-content/uploads/2018/08/FCIA_SolutionsGuide2019_pg12-13.pdf; 2 pages.

U.S. Appl. No. 16/120,894, filed Sep. 4, 2018, Entitled: Controlling Access Between Nodes by a Key Server, First Named Inventor: Patricia G. Driever.

U.S. Appl. No. 16/120,933, filed Sep. 4, 2018, Entitled: Shared Key Processing by a Host to Secure Links, First Named Inventor: Patricia G. Driever.

U.S. Appl. No. 16/120,975, filed Sep. 4, 2018, Entitled: Securing a Storage Network Using Key Server Authentication, First Named Inventor: Patricia G. Driever.

U.S. Appl. No. 16/121,006, filed Sep. 4, 2018, Entitled: Shared Key Processing by a Storage Device to Secure Links, First Named Inventor: Patricia G. Driever.

U.S. Appl. No. 16/121,026, filed Sep. 4, 2018, Entitled: Securing a Path at a Selected Node, First Named Inventor: Patricia G. Driever.

U.S. Appl. No. 16/121,050, filed Sep. 4, 2018, Entitled: Securing a Path at a Node, First Named Inventor: Patricia G. Driever.

U.S. Appl. No. 16/121,097, filed Sep. 4, 2018, Entitled: Automatic Re-Authentication of Links Using a Key Server, First Named Inventor: Roger G. Hathorn.

S. Chandra, et al, "A Comparative survey of Symmetric and Asymmetric Key Cryptography",IEEE International Conference on Electronics, Communication and Computational Engineering (ICECCE), 2014, 11 pages.

* cited by examiner

CHANNEL KEY LOADING IN A COMPUTING ENVIRONMENT

BACKGROUND

The present invention generally relates to providing security within computing environments, and in particular to channel key loading of a host bus adapter (HBA) based on a secure key exchange (SKE) authentication response by a node of a computing environment.

Encryption provides data security for data and/or other information being transmitted between two entities, such as a source node and a target node coupled via a plurality of endpoints or links. To standardize aspects of encryption, various standards are provided for different types of communication protocols. For instance, the FC-SP-2 and FC-LS-3 standards are provided for Fibre Channels.

The FC-SP-2 standard, as an example, used for encrypting Fibre Channel links includes protocols for mutual authentication of two endpoints, as well as protocols for negotiating encryption keys that are used in communication sessions between the two endpoints. The standard provides support for a variety of mechanisms to authenticate the involved parties, as well as mechanisms by which key material is provided or developed. The standard is defined for several authentication infrastructures, including secret-based, certificate-based, password-based, and pre-shared key based, as examples.

Generally, a certificate-based infrastructure is considered to provide a strong form of secure authentication, as the identity of an endpoint is certified by a trusted certificate authority. The FC-SP-2 standard defines a mechanism by which multiple certified entities can use the public-private key pairs that the certificate binds them to in order to authenticate with each other. This authentication occurs directly between two entities through the use of the Fibre Channel Authentication protocol (FCAP), the design of which is based on authentication that uses certificates and signatures as defined in, for instance, the Internet Key Exchange (IKE) protocol.

However, the exchange and validation of certificates inline is compute intensive, as well as time-consuming. The FCAP protocol is also performed on every Fibre Channel link between the entities. Since it is to be done before any client traffic flows on the links that are to be integrity and/or security protected, it can negatively impact (elongate) the link initialization times, and hence, the time it takes to bring up and begin executing client workloads. The IKE protocol also involves fairly central processing unit intensive mathematical computations, and in an environment that includes large enterprise servers with a large number of Fibre Channel physical ports in a dynamic switched fabric connected to a large number of storage controller ports, the multiplier effect of these computations and the high volume of frame exchanges to complete the IKE protocol can also negatively affect system initialization and cause constraints in heavy normal operation.

SUMMARY

Embodiments of the present invention are directed to channel key loading of a host bus adapter (HBA) based on a secure key exchange (SKE) authentication response by a responder node of a computing environment. A non-limiting example computer-implemented method includes receiving an authentication response message at an initiator channel on an initiator node from a responder channel on a responder node to establish a secure communication, the receiving at a local key manager (LKM) executing on the initiator node. A state check can be performed based on a security association of the initiator node and the responder node. An identifier of a selected encryption algorithm can be extracted from the authentication response message. The initiator channel can request to communicate with the responder channel based at least in part on a successful state check and the selected encryption algorithm.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
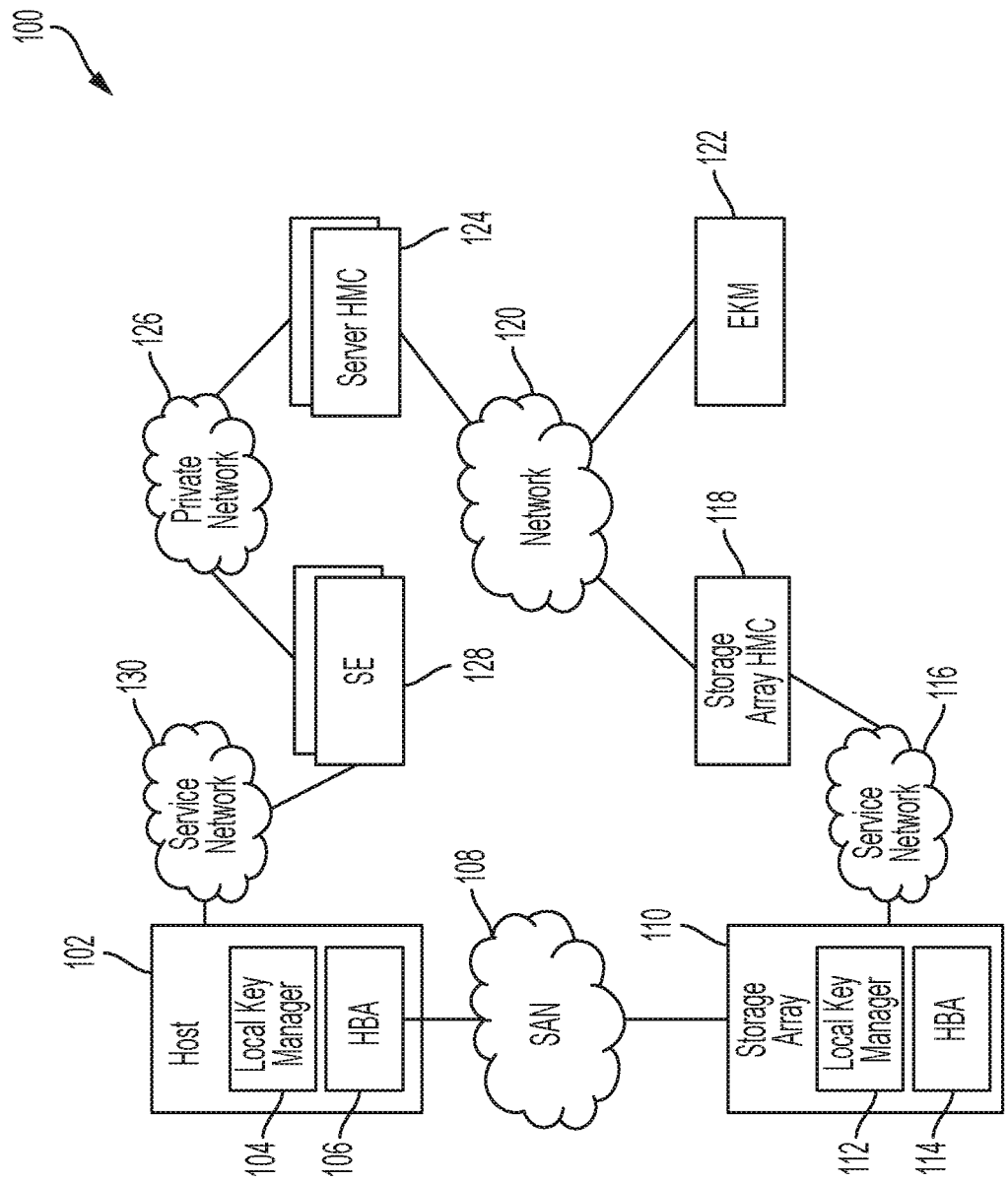
FIG. 1 depicts an example of a computing environment to incorporate and use one or more embodiments of the present invention.

In accordance with one or more embodiments of the present invention, as data is being moved within and across data centers, authentication of the identities exchanging data and encryption of the data are used to strengthen security of the data. In one example, Fibre Channel Endpoint Security (FCES), offered by International Business Machines Corporation, Armonk, New York is used to encrypt data in flight using the Fibre Channel and Fibre Connection (FICON) protocols. FCES helps to ensure the integrity and confidentiality of all data flowing on Fibre Channel links between authorized hosts and storage devices, by creating a trusted storage network that encrypts data in flight. In one or more embodiments of the present invention, security levels are negotiated and established between the host and storage devices using secure key exchange (SKE) messaging. As part of this process, SKE request and response messages are generated and processed to ensure that the correct level of security is used by the end points (i.e., the hosts and the storage devices).

As used herein the term "secure key exchange" or "SKE" refers to a protocol used to create a security association (SA) between two endpoints, or nodes, in a network. One of more embodiments of the SKE protocol described herein build upon the Internet Key Exchange (IKE) protocol. In accordance with one or more embodiments of the present invention, a local key manager (LKM) executing on each node connects to a security key lifecycle manager, which is used to create shared secret messages to which only the parties involved have access. In accordance with one or more embodiments of the present invention, the LKM acts as a client of the security key lifecycle manager, issuing key management interoperability protocol (KMIP) requests to create keys. One or more embodiments of the SKE protocol involve the exchange of four messages. The first two messages referred to as "SKE SA Init Request" (also referred to herein as a "SKE SA initialization request") and "SKE SA Init Response" (also referred to herein as a "SKE SA initialization response") are unencrypted messages that exchange parameters which are used to derive a set of cryptographic keys. The final two messages referred to as "SKE Auth Request" (also referred to herein as an "SKE authentication request") and "SKE Auth Response" (also referred to herein as an "SKE authentication response") are encrypted messages that establish the authenticity of each endpoint, or node, as well as identify which encryption algorithm will be used to secure the communication between the endpoints. In a Fibre Channel environment, the SKE messages can be encapsulated, for example, in AUTH extended link service requests (AUTH ELS) in a format defined by the FC-SP-2 standard.

One or more embodiments of the present invention provide host bus adapter (HBA) security registration with an LKM for SKE message processing to allow secure data to be sent between computing nodes (or between channels on the same computing node) in a computing environment. In accordance with one or more embodiments of the present invention, the LKM, which manages private security keys for the HBAs on a computing node, is initialized on the computing node. The LKM establishes a connection with an external key manager (EKM) remote from the computing node. In addition, the HBAs on the computing node executing the LKM are registered with the LKM. The registration of the HBAs with the LKM allows channels of the HBAs to properly process SKE messages sent to or received from the computing node. Once LKM initialization is complete, the LKM is aware of the security capabilities of the HBAs. The LKM uses this information to build and manage the security of data requests between the computing node and other computing nodes in the computing environment.

One or more embodiments of the present invention provide generation of an SKE SA initialization request, or SKE SA Init Request, to provide security for data transfers between channels in a computing environment. The SKE SA initialization request processing is performed subsequent to LKM initialization and registration of the HBAs on the computing node that is generating the SKE SA initialization request. The SKE SA initialization request can be generated by an LKM executing on the computing node in response to receiving a request from a HBA (also referred to herein as a "channel") of the computing node to communicate (e.g., send data to) another channel. The other channel can be located on the same node to provide the ability to securely pass data between two different partitions executing on the node. The other channel can also be located on a different computing node to provide the ability to securely pass data between channels located on different computing nodes.

The node with the channel that is initiating the request to communicate with another channel is referred to herein as the "initiator" or "source" node; and the node that contains the other channel that is the target of the request is referred to herein as the "responder" or "target" node. Upon receiving the request from the HBA, or channel, to communicate with a channel on a target node, the LKM on the source node creates an SA and then sends a request message (referred to herein as an "SKE SA initialization request message") to the channel on the target node via the requesting channel. In accordance with one or more embodiments of the present invention, the SKE SA initialization request message includes a shared key identifier) provided by the EKM) that identifies a shared key that is to provide secure communication between the source node and the target node. A shared key rekey timer can be set by the LKM to limit the lifespan of the shared key based on a system policy. In addition to the shared key, the SKE SA initialization request message includes a nonce and a security parameter index (SPI) of the initiator channel that are used to derive keys for encrypting and decrypting payloads (e.g., data) sent between the nodes.

As used herein, the term "node" or "computing node" refers to but is not limited to: a host computer and a storage array. A storage array can be implemented, for example, by a control unit and/or a storage controller. A host computer, or host, can be implemented, for example, by a processor, a computer system, and/or a central electronics complex (CEC). As used herein, the term "computing environment" refers to a group of nodes that are coupled together to perform all or a subset of the processing described herein. For FICON channel to channel (CTC) connections, each of the ports, or channels, can be both initiators and responders. In contrast to FICON channels, Fibre Channel protocol (FCP) storage channels on a host are always the source, or initiator; and the control unit, or storage array, is always the target, or responder.

One or more embodiments of the present invention provide SKE SA initialization processing and message generation at a node of a target channel. The processing and generation of an SKE SA Init Response message is performed in response to the target channel receiving an SKE SA Init Request from a source channel. The processing at the responder, or target, node includes the LKM obtaining the shared key (if needed), and transmitting a nonce generated by the LKM and an SPI describing the target channel to the channel on the initiator node via an SKE SA Init Response message. When the processing associated with the SKE SA Init Request and SKE SA Init Response messages is completed, the initiator and the responder nodes have the shared key information that they need to transmit encrypted messages between them and to decrypt the messages that they receive.

One or more embodiments of the present invention provide SKE SA initialization response message processing and SKE Auth Request message generation at a node of a source channel. The processing and generation of an SKE Auth Request message are performed in response to the source channel receiving an SKE SA Init Response from a target channel. The processing at the initiator, or source, node can include SKE SA Init Response message verification and device group checking based on the SA. The LKM of the source node can generate session keys and build an SKE Auth Request message. The source node transmits the SKE Auth Request message to the target node.

One or more embodiments of the present invention provide SKE Auth Request message processing and SKE Auth Response message generation at a node of a target channel. The processing and generation of an SKE Auth Response message are performed in response to the target channel receiving an SKE Auth Request from a source channel. The processing at the responder, or target, node can include SKE Auth Request message verification and device group checking based on the SA. The LKM of the target node can decrypt the SKE Auth Request message, verify an initiator signature, generate a responder signature, select an encryption algorithm, and build an SKE Auth Response message. The target node transmits the SKE Auth Response message to the source node.

One or more embodiments of the present invention provide SKE Auth Response message processing and HBA key loading at a node of a target channel. The processing and HBA key loading are performed in response to the source channel receiving an SKE Auth Response from a target channel. The processing at the initiator, or source, node can include SKE Auth Response message verification and device group checking based on the SA. The LKM of the source node can decrypt the SKE Auth Response message, verify the responder signature, select an encryption algorithm, and load one or more HBA keys at the source channel to support using the selected encryption algorithm in future communication with the target channel. Upon notifying the LKM of the source node that authentication is done, a session key rekey timer can be started to initiate a session key rekey process based on a system policy.

One or more embodiments of the present invention provide a process for refreshing, or rekeying, the shared key(s) and the session key(s). As described previously, a shared key rekey timer can be set to limit the amount of time that a shared key can be used. When the shared key rekey timer expires, a process to generate a new shared key is initiated. Also, as described previously, a session key rekey timer can be set to limit the amount of time that a session key can be used. When the session key rekey timer expires, an SKE SA Init Request message is generated to initiate the derivation of a new set of cryptographic keys for use in communication between the source and target nodes.

Authentication, via the EKM, between the trusted nodes that share multiple links is performed once, instead of on a link by link basis. The ability of both entities to receive a shared key (e.g., a symmetric key) as trusted entities of the EKM and to use it to encrypt/decrypt messages between them proves mutual authentication. Further, secure communication across all links (or selected links) connecting them is provided without additional accesses to the EKM. Instead, the previously obtained shared key is used in communications between the trusted nodes on other links, or channels, coupling the nodes providing authentication of the links, without having to re-authenticate the trusted nodes via the EKM.

In accordance with one or more embodiments described herein, a trusted node initiates and activates an LKM executing on the trusted node to manage security between HBAs. The HBAs register their security capabilities and address information with the LKM in order to allow channels on the HBA to process SKE messages. SKE SA initialization request messages can be built based on an HBA channel on a trusted node requesting SKE SA initialization between itself (an initiator node) and a target, or responder node. The LKM manages the identification or activation of a device group key identifier for the two trusted nodes that is used to build the SKE SA initialization request. The LKM on the initiator node and the LKM on the responder node trade information via SKE SA initialization request and response messages. The traded information is used to encrypt and decrypt data sent between the channels on the respective nodes. The SKE SA initialization request and response messages can be exchanged in an unencrypted format, and SKE authentication request and response messages can be sent in an encrypted format. The SKE authentication request messages can include a proposal list of encryption algorithms to be used for data exchanged between the nodes, and the SKE authentication response messages can confirm which proposal was accepted by the responder node as a selected encryption algorithm. The responder node can also notify the initiator node when to begin data transfers using the selected encryption algorithm, which can be a different encryption format than the encryption used to send the SKE authentication request and response messages. Both the shared key and the session key(s) can be refreshed, or rekeyed, based on programmable timers expiring.

One example of a computing environment 100 to include one or more aspects of the present invention is described with reference to FIG. 1. In the example shown in FIG. 1, the computing environment includes at least one node (e.g., host 102) and at least one other node (e.g., storage array 110) coupled together via a storage area network (SAN) 108. The host 102 can include a central processing unit and memory and be implemented by a system such as, but not limited to a System z offered by International Business Machines Corporation. The host 102 shown in FIG. 1 includes an LKM 104 and one or more HBAs 106. In accordance with one or more embodiments of the present invention, the LKM 104 is a component that manages the private keys for the HBAs 106, and each of the HBAs 106 provide an input/output (I/O) interface that transmits and encrypts data. The storage array 110 can be implemented, for example, by a storage device, a direct access storage device (DASD), or a tape device. One example of a storage device that can be utilized includes DS8000 offered by International Business Machines Corporation. The storage array 110 shown in FIG. 1 includes an LKM 112 and one or more HBAs 114. The SAN 108 can be implemented by a network of FICON and Fibre Channel switches and directors. FICON is a known communication path for data between the host and the storage device utilizing Fibre Channel technology.

The computing environment shown in FIG. 1 also includes one or more support elements (SE) 128 coupled to one of more hosts 102 via a service network 130. The SEs 128 are also coupled to a server hardware management console (HMC) 124 via a private network 126. The service network 130 in an internal server network that is used by the SEs 128 to communicate with each subsystem, or host 102 and can be implemented, for example, by an Ethernet network or other known local area network (LAN). In the embodiment shown in FIG. 1, the private network 126 is used for SE 128 to server HMC 124 communication and can be implemented, for example, by an Ethernet network or other known LAN. Each server HMC 124 manages multiple hosts 102 and, as shown in FIG. 1, they can communicate with the SEs 128 over the private network 126 using, for example, an SE certificate. SE 128 can be implemented by a server and is used to manage hardware that communicates to the LKM 104 in host 102 via the service network 130. In an embodiment, each SE 128 corresponds to one host 102 and includes the instructions to initialize the corresponding host 102 using an SE certificate. Having the SEs 128 communicate with the hosts 102 via an internal network provides an additional level of protection to the SE certificate. In accordance with one or more embodiments of the present invention, the host 102 is configured by a customer to utilize the security features described herein.

As shown in FIG. 1, the server HMCs 124 are coupled to storage array HMCs 118 and EKM 122 via network 120. Each storage array HMC 118 can be used to manage multiple storage arrays 110 and, as shown in FIG. 1, they can communicate with the storage arrays 110 via service network 116. Service network 116 can be implemented, for example, by an Ethernet network or other known LAN. Network 120 can be implemented by any network known in the art, such as, but not limited to a wide area network (WAN) and a LAN. In accordance with one or more embodiments of the present invention, the EKM 122 is used to provide shared keys to the host 102 and the storage array 110. It is trusted by the host 102 and the storage array 110 via, for example, certificates installed on the host 102, storage array 110, and EKM 122 at set-up, and signed by a certification authority (not shown).

The HBAs 106 in the host 102 and the HBAs 114 in the storage array 110 shown in FIG. 1 communicate via SAN 108. The SAN 108 can include Fibre Channel nodes that are connected via an optical cable where data is exchanged using an optical transceiver. The physical link specifications can be defined, for example, by FC-PI. The Fibre Channel communication can encapsulate multiple higher-level protocols such as FICON, defined by FC-SB2, as well as Fibre Channel protocol for SCSI, defined by FCP-4.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1, with some components shown in FIG. 1 combined or the functions performed by one or more components performed by different or several components. Further, the embodiments described herein with respect to computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although examples of protocols, communication paths and technologies are provided herein, one or more aspects are applicable to other types of protocols, communication paths and/or technologies. Further, other types of nodes may employ one or more aspects of the present invention. Additionally, a node may include fewer, more, and/or different components. Moreover, two nodes coupled to one another may be both the same type of node or different types of nodes. As examples, both nodes are hosts, both nodes are storage arrays, or one node is a host and another node is a storage array, as described in the examples herein. Many variations are possible.

As an example, a host may be a computing device, such as a processor, a computer system, a central electronics complex (CEC), etc. One example of a computer system that may include and/or use one or more aspects of the present invention is depicted in FIG. 2A.

Figure 2A:
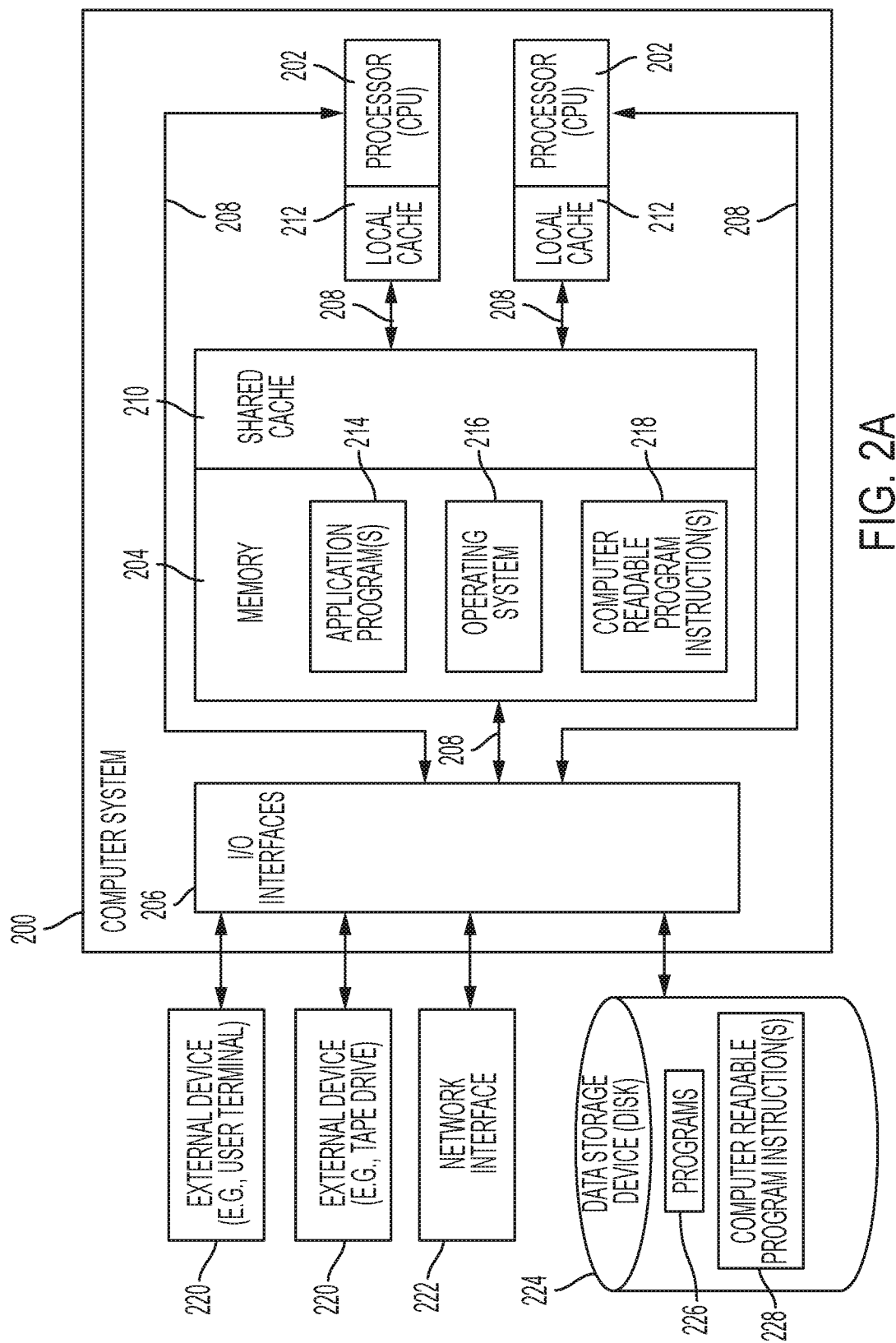
FIG. 2A depicts an example of a host of the computing environment of FIG. 1 to incorporate and/or use one or more embodiments of the present invention.

Referring to FIG. 2A, in one example, a computer system 200 is shown in the form of a general-purpose computing device. Computer system 200 includes and/or is coupled to a plurality of components, which are in addition to and/or include the components shown in FIG. 1 including, but not limited to, LKM 104, HBA 106, LKM 112, HBA 114, service network 130, and service network 116, which are part of and/or coupled to the computer system, but not explicitly indicated in FIG. 2A. In one example, computer system 200 includes, but is not limited to, one or more processors or processing units 202 (e.g., central processing units (CPUs), processing circuits), a memory 204 (a.k.a., system memory, main memory, main storage, central storage or storage, as examples), and one or more input/output (I/O) interfaces 206, coupled to one another via one or more buses and/or other connections 208.

Continuing with FIG. 2A, bus 208 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 204 may include, for instance, a cache, such as a shared cache 210, which may be coupled to local caches 212 of processors 202. Further, memory 204 may include one or more programs or applications 214, an operating system 216, and one or more computer readable program instructions 218. Computer readable program instructions 218 may be configured to carry out functions of embodiments of aspects of the invention.

Computer system 200 may also communicate via, e.g., I/O interfaces 206 with one or more external devices 220, one or more network interfaces 222, and/or one or more data storage devices 224. Example external devices include a user terminal, a tape drive, a pointing device, a display, etc. Network interface 222 enables computer system 200 to communicate with one or more networks, such as a local area network (LAN), a general wide area network (WAN), and/or a public network (e.g., the Internet), providing communication with other computing devices or systems.

Data storage device 224 may store one or more programs 226, one or more computer readable program instructions 228, and/or data, etc. The computer readable program instructions may be configured to carry out functions of embodiments of aspects of the invention.

Computer system 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 200. Examples, include, but are not limited to: microcode, device drivers, redundant processing units, external disk drive arrays, RAID systems, tape drives, and data archival storage systems, etc.

Computer system 200 may be operational with numerous other general purpose or special purpose computing system environments or configurations. Examples of well-known computing systems, environments, and/or configurations that may be suitable for use with computer system 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated above, a computer system is one example of a host that may incorporate and/or use one or more aspects of the present invention. Another example of a host to incorporate and/or employ one or more aspects of the present invention is a central electronics complex, an example of which is depicted in FIG. 2B.

Figure 2B:
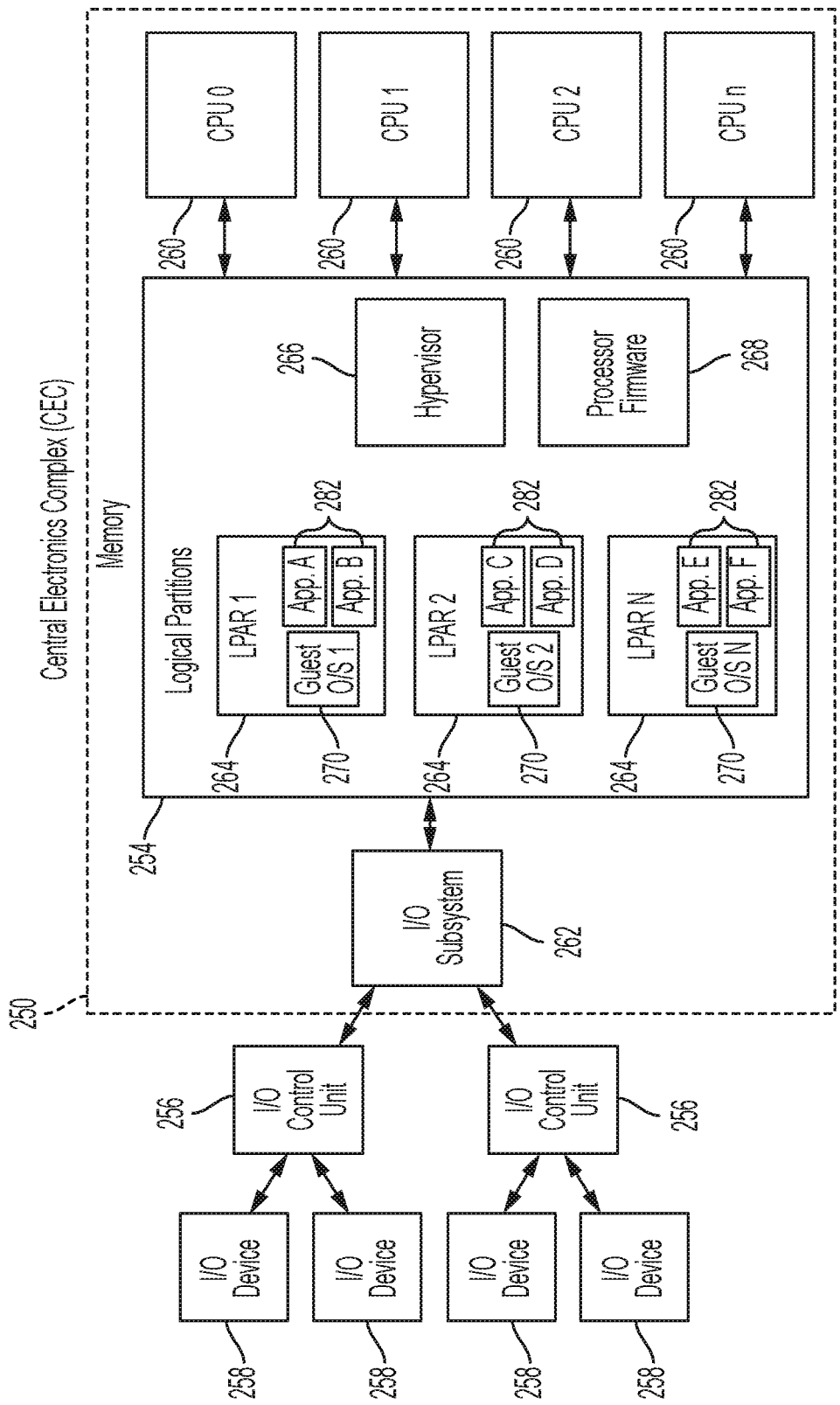
FIG. 2B depicts another example of a host of the computing environment of FIG. 1 to incorporate and/or use one or more embodiments of the present invention.

Referring to FIG. 2B, in one example, a central electronics complex (CEC) 250 includes and/or is coupled to a plurality of components, which are in addition to and/or include the components shown in FIG. 1 including, but not limited to, local key manager (LKM) 104, HBA 106, LKM 112, HBA 114, service network 130, and service network 116, which are part of and/or coupled to the central electronics complex, but not explicitly indicated in FIG. 2B. In one example, CEC 250 includes, but is not limited to, a memory 254 (a.k.a., system memory, main memory, main storage, central storage, storage) coupled to one or more processors (a.k.a., central processing units (CPUs)) 260, and to an input/output subsystem 262.

In one example, memory 254 of central electronics complex 250 includes, for example, one or more logical partitions 264, a hypervisor 266 that manages the logical partitions, and processor firmware 268. One example of hypervisor 266 is the Processor Resource/System Manager (PR/SM), offered by International Business Machines Corporation. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 264 is capable of functioning as a separate system. That is, each logical partition can be independently reset, run a guest operating system 270 such as z/OS, offered by International Business Machines Corporation, or another operating system, and operate with different programs 282. An operating system or application program running in a logical partition appears to have access to a full and complete system, but in reality, only a portion of it is available.

Memory 254 is coupled to processors (e.g., CPUs) 260, which are physical processor resources that may be allocated to the logical partitions. For instance, a logical partition 264 includes one or more logical processors, each of which represents all or a share of a physical processor resource 260 that may be dynamically allocated to the logical partition.

Further, memory 254 is coupled to I/O subsystem 262. I/O subsystem 262 may be a part of the central electronics complex or separate therefrom. It directs the flow of information between main storage 254 and input/output control units 256 and input/output (I/O) devices 258 coupled to the central electronics complex.

While various examples of hosts are described herein, other examples are also possible. Further, a host may also be referred to herein as a source, a server, a node, or an endpoint node, as examples. Additionally, a storage device may be referred to herein as a target, a node, or an endpoint node, as examples. Example storage devices include storage controllers or control units. Other examples are also possible.

Figure 3:
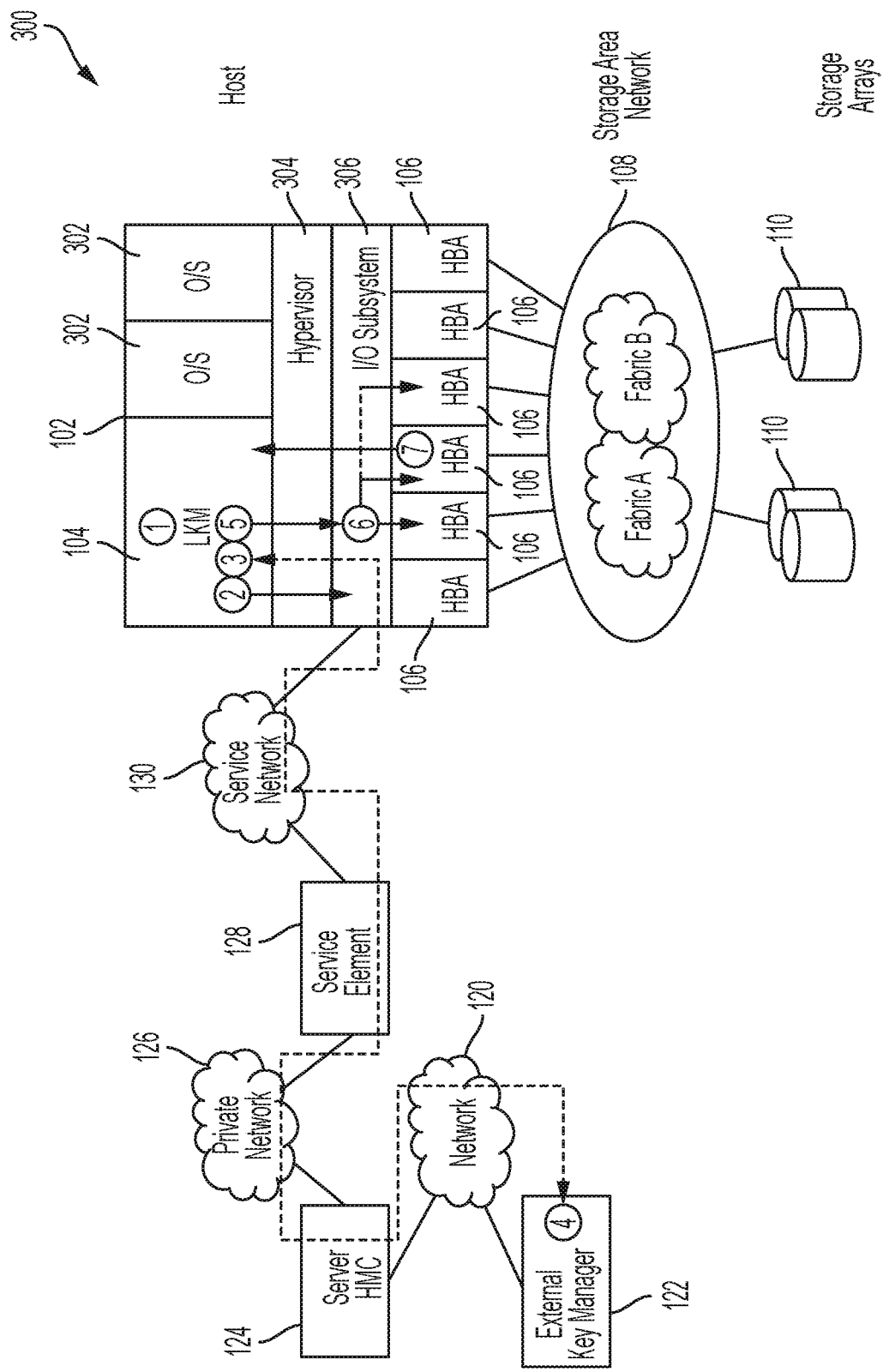
FIG. 3 depicts a block diagram of a computing environment for local key manager (LKM) initialization and host bus adapter (HBA) security registration according to one or more embodiments of the present invention.

Turning now to FIG. 3, a block diagram of a computing environment 300 for LKM initialization and HBA security registration is generally shown in accordance with one or more embodiments of the present invention. The components shown in FIG. 3 include host 102, SAN 108, storage arrays 110, service network 130, SE 128, private network 126, server HMC 124, network 120, and EKM 122 as described previously with respect to FIG. 1. The host 102 shown in FIG. 3 is implemented by a server that is executing several logical partitions, or partitions, including two partitions running operating systems (O/Ss) 302 and one partition executing the LKM 104. The host 102 shown in FIG. 3 includes a hypervisor 304 for managing the partitions, and an interface between the partitions and an input/output (I/O) subsystem 306. The I/O subsystem 306 as shown in FIG. 3 provides an interface to the HBAs 106.

In accordance with one or more embodiments of the present invention, LKM activation and initiation is triggered by a customer (e.g., owner of the host 102) requesting that security be applied to the host 102. This can occur for example, by the customer applying a feature code that they purchased by enabling the feature code in the SE 128 and rebooting the SE 128. Upon reboot, the SE 128 can trigger the host 102 to initialize a partition for executing the LKM 104. A reboot of the SE 128 is not required to activate and initiate the LKM, and in another example, the LKM is activated and initiated by enabling the feature code in the SE 128 without rebooting the SE 128. The triggering event to activate and initialize the LKM 104 is shown as "1" in FIG. 3. Once the LKM is activated and initialized, the LKM 104 notifies the I/O subsystem 306 that the initialization is complete. This notification event is shown as "2" in FIG. 3. As shown in FIG. 3, the notification is initiated by the LKM 104, which notifies the hypervisor 304, which in turn notifies the I/O subsystem 306 that LKM initialization is complete. In accordance with one or more embodiments, LKM initialization is complete once the LKM 104 is executing on the host 102.

In accordance with one or more embodiments of the present invention, once LKM initialization is complete, the LKM 104 contacts the EKM 122 to request a secure connection to the EKM 122. In accordance with one or more embodiments of the present invention, the host 102 executing the LKM 104 is a trusted node that has been certified by a trusted certificate authority. In accordance with one or more embodiments, the host 102 has the Internet Protocol (IP) address or hostname of the EKM along with host's signed certificate from the trusted certificate authority. Contacting the EKM 122 to request connection is shown as "3" in FIG. 3. As shown in FIG. 3, the connection request spans several components connecting the LKM 104 to the EKM 122: hypervisor 304, I/O subsystem 306, service network 130, service element 128, private network 126, server HMC 124, and network 120. In accordance with one or more embodiments of the present invention, the LKM 104 sends the request to establish a connection with the EKM 122 to the hypervisor 304, which sends the request to the I/O subsystem 306, which sends the request to the SE 128 via service network 130. The SE 128 sends a request to the server HMC 124 via private network 126 to open a proxy connection (e.g., a transport layer security, or TLS, session) across network 120 to the EKM 122.

In accordance with one or more embodiments, a KMIP is used to request the connection from the EKM 122. The KMIP message can include the certificate from the trusted certificate authority and a KMIP message can be returned from the EKM 122, shown as "4" in FIG. 3, with either an indication that a connection has been established or an indication that a connection has not been established. In accordance with one or more embodiments, the secure connection to the EKM 122 can be established if the EKM 122 recognizes the certificate sent by the host 102 in the connection request. In accordance with one or more embodiments, the secure connection to the EKM 122 is not established due, for example, to network connectivity issues, configuration issues, and/or the EKM 122 not recognizing the certificate. TLS and KMIP are just examples, as other protocols and secure communications may be used.

Based on the connection between the LKM 104 and the EKM 122 being established, the LKM 104 notifies the I/O subsystem 306, via the hypervisor 304, that the connection has been established. This is shown as "5" in FIG. 3. As shown as "6" in FIG. 3, the I/O subsystem 306 notifies the HBAs 106 that the LKM 104 is ready to process SKE messages (i.e., ready to provide secure data transfer with other computing nodes). As shown as "7" in FIG. 3, the HBAs 106 register their security capabilities and address information with the LKM 104. Examples of security capabilities include but are not limited to: authentication or different types of encryption. The address information can include but is not limited to: the Fibre Channel address assigned to the HBA.

It is to be understood that the block diagram of FIG. 3 is not intended to indicate that the computing environment 300 is to include all of the components shown in FIG. 3. Rather, the computing environment 300 can include any appropriate fewer or additional components not illustrated in FIG. 3, with some components shown in FIG. 3 combined or the functions performed by one or more components performed by different or several components. Further, the embodiments described herein with respect to computing environment 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
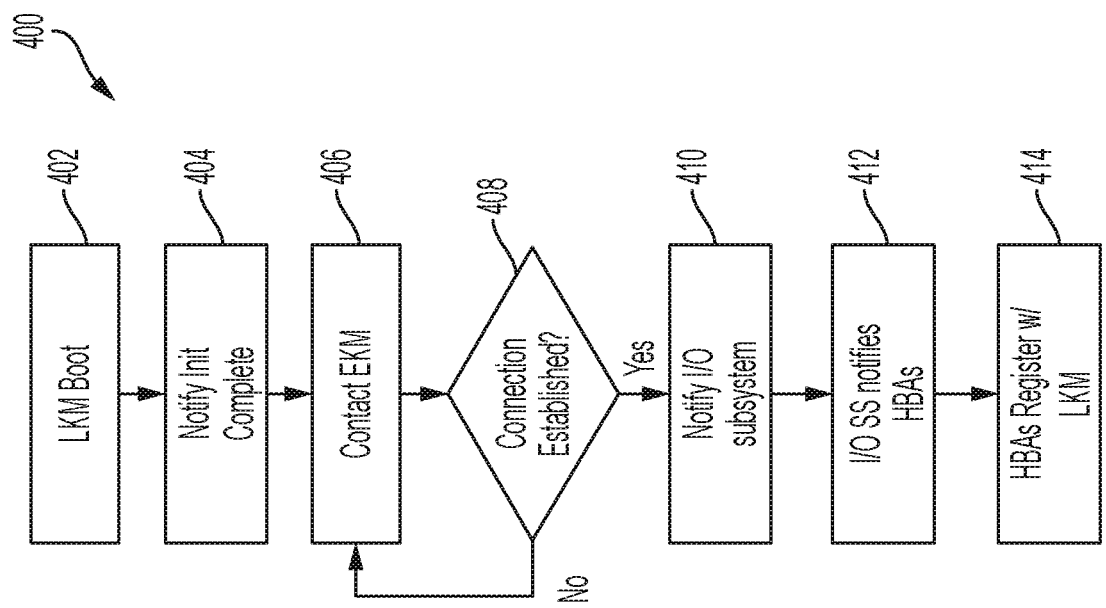
FIG. 4 depicts a process for LKM initialization and HBA security registration according to one or more embodiments of the present invention.

Turning now to FIG. 4, a process 400 for LKM initialization and HBA security registration is generally shown in accordance with one or more embodiments of the present invention. All or a portion of the processing shown in FIG. 4 can be implemented, for example, by LKM 104 of FIG. 1 executing on host 102 of FIG. 1. At block 402, the LKM partition is activated and initialized on a node, such as host 102 of FIG. 1. Processing continues at block 404 with the LKM notifying an I/O subsystem on the node, such as I/O subsystem 306 of FIG. 3, that the initialization of the LKM is complete. At block 406, the LKM initiates contact with an EKM, such as EKM 122 of FIG. 1, to request a secure connection. As described previously, this can be performed using a KMIP message containing the request and a TLS session. At block 408, it is determined whether the connection with the EKM can be established. In accordance with one or more embodiments, the determination is made based on a message returned from the EKM is response to the request sent at block 406.

As shown in the embodiment of the process 400 in FIG. 4, if the connection with the EKM was not established, processing continues at block 406 with attempting another connection. Processing continues at block 410 if it is determined at block 408 that a connection with the EKM was established. At block 410, the LKM notifies the subsystem that an EKM connection has been established and at block 412, the I/O subsystem notifies the HBAs on the node executing the LKM, such as HBAs 106 of FIG. 1, that the LKM is ready to process SKE messages. At block 414, the HBAs on the node executing the LKM register their security capabilities with the LKM.

The process flow diagram of FIG. 4 is not intended to indicate that the operations of the process 400 are to be executed in any particular order, or that all of the operations of the process 400 are to be included in every case. Additionally, the process 400 can include any suitable number of additional operations.

Figure 5:
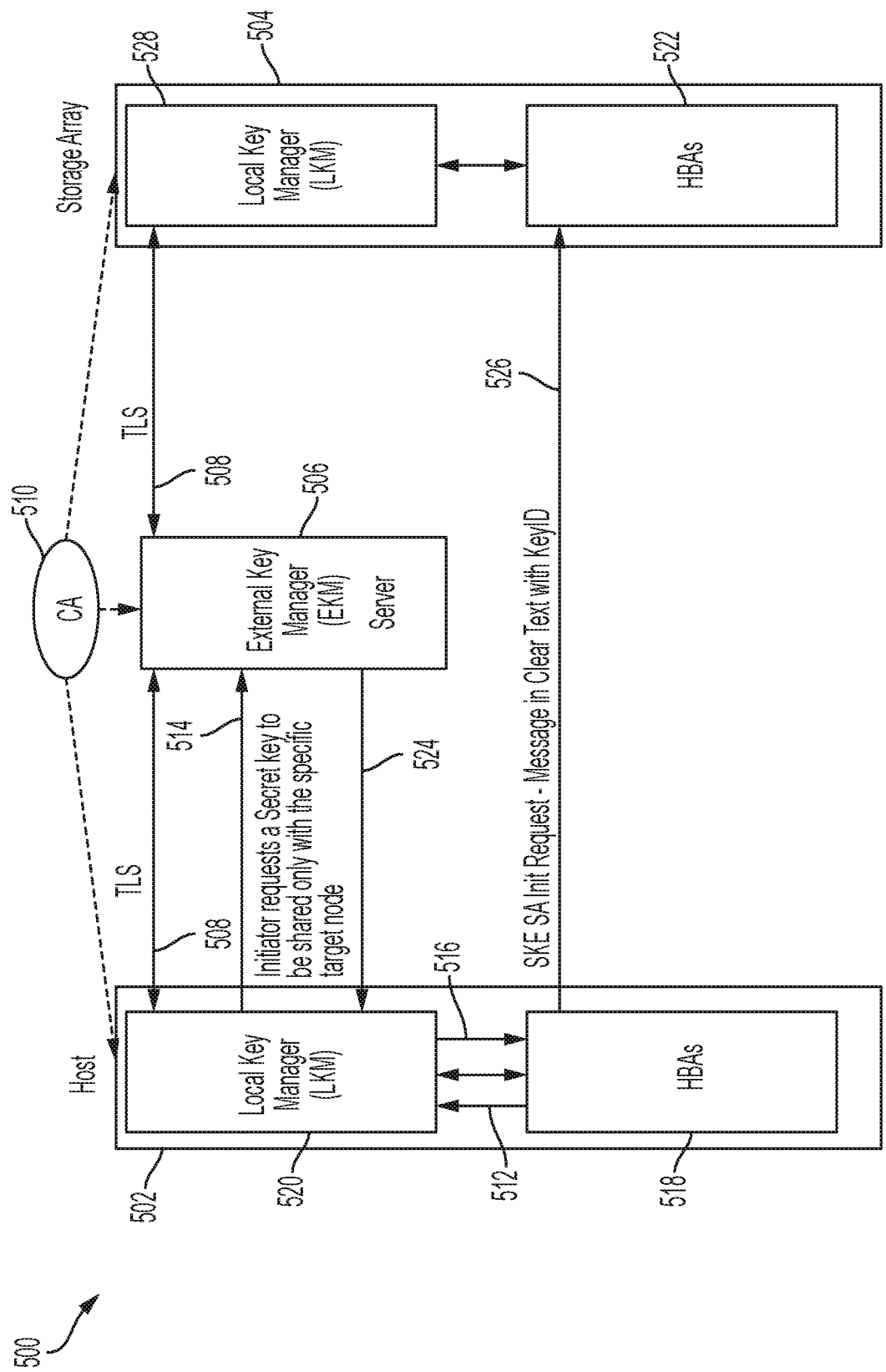
FIG. 5 depicts a block diagram of a computing environment for generating a secure key exchange (SKE) initialization request according to one or more embodiments of the present invention.

Turning now to FIG. 5, a block diagram of a computing environment 500 for generating an SKE SA initialization request (also referred to herein as an "SKE SA Init Request") is generally shown in accordance with one or more embodiments of the present invention. The computing environment 500 shown in FIG. 5 includes two nodes: a host 502 and a storage array 504 that are coupled to an EKM server 506 (also referred to herein as an EKM) via one or more connections 508. As an example, the one or more connections 508 are Ethernet connections protected with a TLS secure communication. The one of more connections 508 can include all, a subset, or a superset of the elements shown in FIGS. 1 and 3. The EKM server 506 includes computer instructions to perform the EKM processing described herein. In the embodiment shown in FIG. 5, host 502, storage array 504, and EKM server 506 are coupled to a certification authority (CA) 510 which is used to sign certificates installed on the host 502, the storage array 504, and the EKM sever 506 to establish trust between them.

As shown in FIG. 5, the host 502 includes LKM 520 coupled to HBAs 518 (e.g., Fibre Channel ports, or FICON channels, or other links) that are used to communicate with storage array 504 via, for example a SAN network such as SAN 108 of FIG. 1. Though not shown in FIG. 5, the host 502 and storage array 504 can also include one or more Ethernet ports that are coupled to the EKM server 506 via a connection 508. FICON is a known communication path for data transfer between the host 502 and the storage array 504, and Ethernet is a known local area network (LAN). Similarly, in the example, the storage array 504 includes LKM 528 coupled to HBAs 522 (e.g., Fibre Channel ports, or FICON channels) that are used to communicate with host 502.

As shown by arrow 512 of FIG. 5, the LKM 520 receives a request from an HBA 518 on host 502 to send data to an HBA 522 on storage array 504. In response to receiving the request from the HBA 518, the LKM 520 on the host 502 determines whether an SA already exists between the HBA 518 on the host 502 (the "initiator node") and the HBA 522 on the storage array 504 (the "responder node"). In accordance with one or more embodiments of the present invention, only one communication path at a time can be open between the HBA 518 on host 502 and the HBA 522 on storage array 504. Thus, if an SA currently exists, either a communication path is already in process between these two channels or an error has occurred (e.g., the request from the HBA 518 on host 502 has an error and has requested the wrong target node and/or target channel). In either case, an error message is returned to the requesting HBA 518 and the request rejected.

If an SA does not exist, then the LKM 520 on host 502 enters a state where it creates an SA between the HBA 518 on host 502 and the HBA 522 on storage array 506. The LKM 520 on host 502 determines whether it has a shared key and shared key identifier for the host 502/storage array 504 pair. The shared key and shared key identifier may be stored, for example, in volatile memory (e.g., cache memory) located on the host 502 that is accessible by the LKM 520. If the LKM 520 does not locate a shared key for the host 502/storage array 504 pair, then it sends a request, as shown by arrow 514 on FIG. 5, to the EKM server 506 to retrieve a shared key for the host 502/storage array 504 pair and set up a device group that includes the host 502/storage array 504 pair (if one doesn't already exist) on the EKM server 506. In accordance with one or more embodiments of the present invention, this is performed by a multiple step process where the LKM 520 first queries the EKM server 506 to determine whether a device group exists for the host 502/storage array 504 pair and upon determining that the device group doesn't exist, requesting the EKM server 506 to create one. Once it is determined that the device group exists for the host 502/storage array 504 pair, the LKM 520 requests a shared key that corresponds to device group.

The host 502 and/or storage array 504 may be identified to the EKM by their respective world-wide node names (WWNN). In response to receiving the request from the LKM 520, the EKM server 506 authenticates the LKM and, if required, creates a device group that includes the host 502/storage array 504 pair. The EKM server 506 also generates a shared key (also referred to herein as a "shared secret key") specific to the host 502/storage array 504 pair for use in encrypting and decrypting messages and data transferred between the host 502 and the storage array 504. As shown by arrow 524 of FIG. 5, the EKM server 506 sends the shared key to the requesting LKM 520 on host 502.

The receiving of the shared key by the LKM 520 may be a multiple step process. In accordance with one or more embodiments of the present invention, the LKM 520 first requests a shared key identifier from the EKM server 506 for a specified device group. The shared key identifier is a unique identifier that can be used by the EKM server 506 to locate/determine the corresponding shared key. In response to receiving the shared key identifier, the LKM 520 sends a second request that includes the shared key identifier to the EKM server 506 to request the shared key. The EKM server 506 responds by returning the shared key. In accordance with one or more embodiments of the present invention, the device group name is a concatenation of the WWNNs of the host 502 and the storage array 504. In accordance with one or more embodiments of the present invention, upon receiving the shared key, the LKM 520 may start a shared key rekey timer that is used to limit that amount of time that the shared key may be used before a rekey, or refresh, is required. The amount of time may be based on system policies such as, but not limited to the confidential nature of the data being exchanged, other security protections in place in the computer environment, and/or a likelihood of an unauthorized access attempt. In accordance with one or more embodiments of the present invention, in addition or alternatively to an elapsed amount of time, the shared key rekey timer can expire based on a number of data exchanges between the source node and the target node. The polices can be configured by a customer via a user interface on an HMC such as server HMC 124 or storage array HMC 118 of FIG. 1. When the shared key rekey timer expires, the LKM 520 initiates a process to obtain a new shared key from the EKM server 506 as described in reference to FIG. 15 below.

In response to the LKM 520 having or obtaining a valid shared key and shared key identifier, the LKM 520 generates an SKE SA Init Request message that includes the shared key identifier as well as a nonce and security parameter index (SPI) created by the LKM 520 for the secure communication between the channels. The LKM 520 creates the nonce and SPI using a random number generator. A nonce is an arbitrary number that can be used just once in a cryptographic communication. An SPI is an identification tag that is added to the clear text portion of an encrypted Fibre Channel data frame. The receiver of the frame may use this field to validate the key material used to encrypt the data payload. The SKE SA Init Request message is sent to the HBA 518, or channel, that requested that data be sent to the HBA 522 on storage array 504. This in shown by arrow 516 in FIG. 5. The requesting (or initiator) HBA 518 sends the SKE SA Init Request message, via a SAN network for example, to the target HBA 522 on storage array 504 as shown by arrow 526 in FIG. 5. In accordance with one or more embodiments of the present invention, the SKE SA Init Request message is sent as clear text (i.e., it is not encrypted).

It is to be understood that the block diagram of FIG. 5 is not intended to indicate that the computing environment 500 is to include all of the components shown in FIG. 5. Rather, the computing environment 500 can include any appropriate fewer or additional components not illustrated in FIG. 5, with some components shown in FIG. 5 combined or the functions performed by one or more components performed by different or several components. For example, there may be one or more additional nodes (e.g., hosts and/or storage arrays). Further, the embodiments described herein with respect to computing environment 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 6:
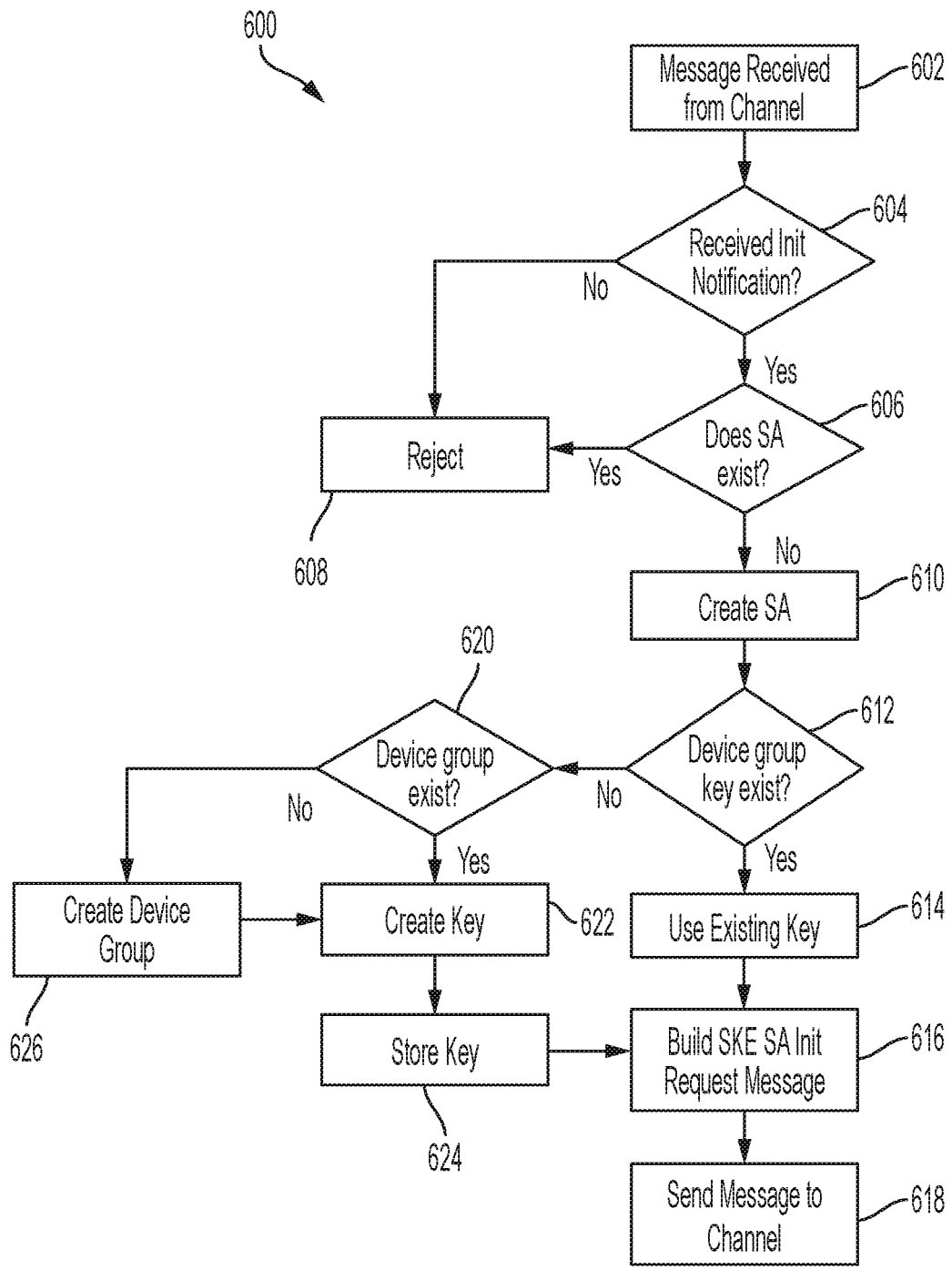
FIG. 6 depicts a process for generating an SKE security association (SA) initialization request according to one or more embodiments of the present invention.

Turning now to FIG. 6, a process 600 for generating an SKE SA initialization request is generally shown in accordance with one or more embodiments of the present invention. All or a portion of the process 600 can be performed, for example by an LKM such as, LKM 520 of FIG. 5. The process 600 begins at block 602 with the LKM receiving a message from a channel (initiator channel) requesting the initialization of a secure communication with another channel (responder channel). For example, the initiator channel can be HBA 106 of FIG. 1 and the responder channel can be HBA 114 of FIG. 1. It is determined at block 604 whether the initiator HBA has been registered with the LKM. If the initiator HBA has not been registered with the LKM, processing continues at block 608 with rejecting the request (e.g., because the LKM cannot determine the security capabilities of the initiator HBA).

If it is determined, at block 604, that the initiator HBA is registered with the LKM, processing continues at block 606. At block 606, it is determined whether an SA already exists between the initiator channel and the responder channel. If an SA already exists, then processing continues at block 608 with rejecting the request.

If it is determined, at block 606, that an SA does not already exist between the initiator node and the responder node, then processing continues at block 610 with creating the SA. Once an SA state has been created at block 610 for the initiator channel/responder channel pair, processing continues at block 612 with determining whether a device group key, or shared key, for the initiator node/responder node pair exists. If a shared key exists for the initiator node/responder node pair, then processing continues at block 614 with using the existing shared key. At block 616, an SKE SA Init Request message is built by the LKM. In accordance with one or more embodiments, the SKE SA Init Request message includes: an identifier of the shared key; and a nonce and SPI created by the LKM for the secure communication between the channels. At block 618, the SKE SA Init Request message is sent to the initiator channel. The initiator channel then sends the SKE SA Init Request message to the responder channel on the responder node.

If it is determined at block 612 that a shared key does not exist for the initiator node/responder node pair, then processing continues at block 620. At block 620, it is determined whether a device group exists for the initiator node/responder node pair. Determining whether the device group exists can include the LKM asking the EKM if a device group exists for the initiator node/responder node pair, and the EKM responding with an identifier of the corresponding shared key (a shared key identifier) if the device group does exist or responding with an error message if it does not. If it is determined that the device group does exist, processing continues at block 622 with creating the shared key for the initiator node/responder node pair and at block 624 the shared key is stored at the initiator node. The shared key can be created by the EKM in response to a request from the LKM. In accordance with one or more embodiments of the present invention, the shared key and the shard key identifier are stored in volatile memory so that the shared key is not saved when the initiator node is powered off or restarted. In accordance with one or more embodiments of the present invention, the shared key has a limited life span based for example on, but not limited to: a number of security associations that the shared key has been used for and/or an elapsed amount of time since the shared key was created. After the shared key is stored, processing continues at block 616 with the LKM building the SKE SA Init Request message.

If it is determined at block 620 that a device group does not exist for the initiator node/responder node pair, block 626 is performed and a device group pair is created for the initiator node/requestor node pair. The device group and shared key can be created by the EKM in response to a single (or multiple) requests from the LKM. Once the device group is created, processing continues at block 622 with creating the shared key for the initiator node/requestor node pair.

The process flow diagram of FIG. 6 is not intended to indicate that the operations of the process 600 are to be executed in any particular order, or that all of the operations of the process 600 are to be included in every case. Additionally, the process 600 can include any suitable number of additional operations.

Figure 7:
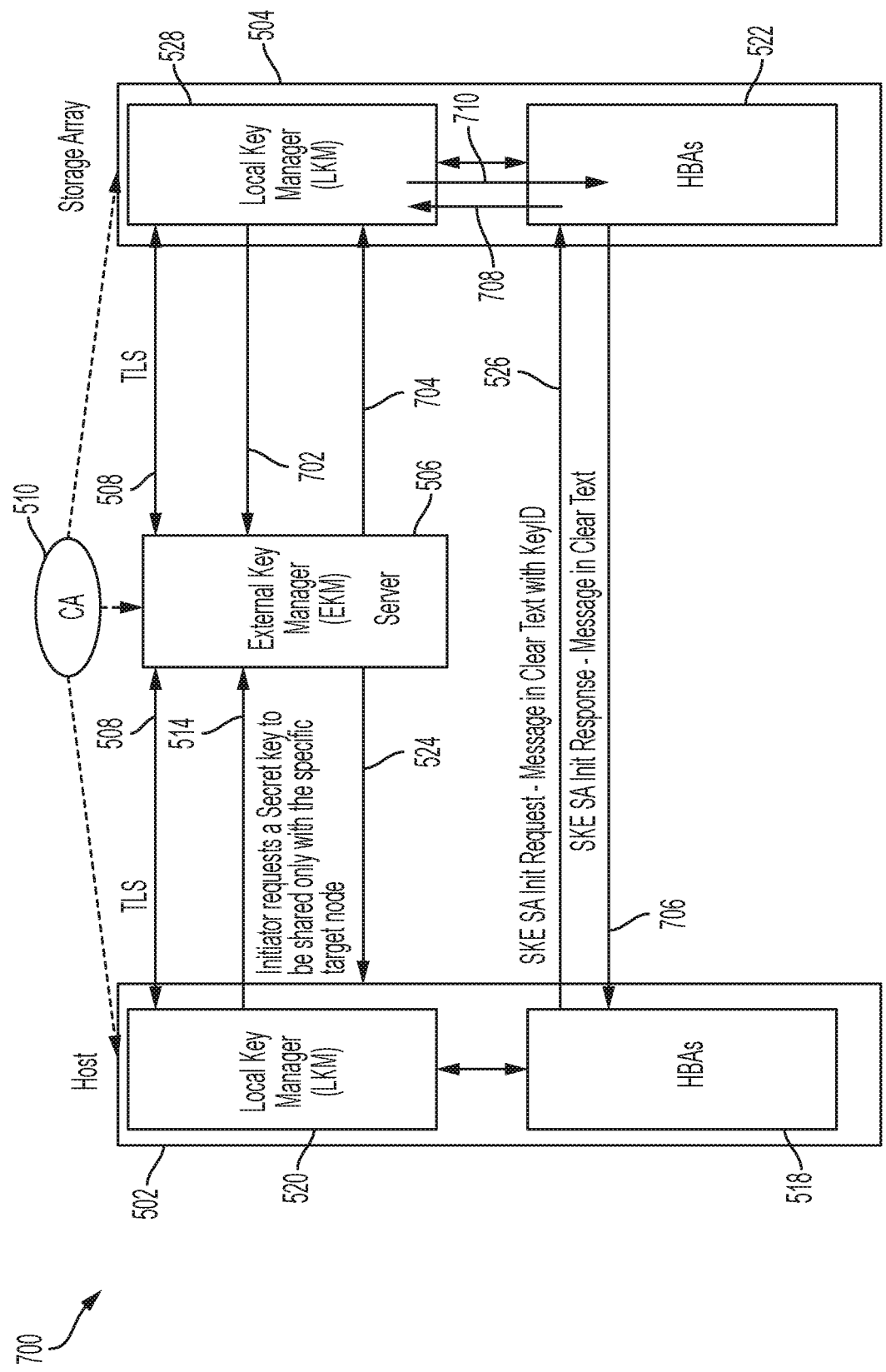
FIG. 7 depicts a block diagram of a computing environment for SKE SA processing and message generation at a node of a target channel according to one or more embodiments of the present invention.

Turning now to FIG. 7, a block diagram of a computing environment 700 for SKE SA initialization processing and message generation at a node of a target channel is generally shown in accordance with one or more embodiments of the present invention. The computing environment 700 shown in FIG. 7 is similar to the computing environment 500 shown in FIG. 5 with the addition of processing of the SKE SA Init Request message at the storage array 504 of the target HBA 522.

As shown by arrow 526 of FIG. 7, the HBA 522 on storage array 504 receives an SKE SA Init Request message from the HBA 518 on host 502. In response to receiving the SKE SA Init Request message, the HBA 522 sends the SKE SA Init Request message to the LKM 528 located on the storage array 504 (as shown in by arrow 708 of FIG. 7). In response to receiving the message, the LKM 528 on the storage array 504 determines whether an SA already exists between the HBA 518 on host 502 and the HBA 522 on storage array 504. If an SA already exists, an error message is returned to the HBA 522 and the request is rejected.

If an SA does not exist, then the LKM 528 on storage array 504 enters a state where it creates an SA between the HBA 518 on host 502 and the HBA 522 on storage array 506. The LKM 528 on storage array 504 determines whether it has a shared key that corresponds to the shared key identifier contained in the SKE SA Init Request. The shared key and its corresponding shared key identifier may be stored, for example, in volatile memory (e.g., cache memory) located on the storage array 504 that is accessible by the LKM 528. If the LKM 528 does not locate a shared key for the host 502/storage array 504 pair, then it sends a request, as shown by arrow 702 on FIG. 7, to the EKM server 506 to retrieve the shared key that corresponds to the shared key identifier received in the SKE SA Init Request message. In response to receiving the request from the LKM 528, the EKM server 506 authenticates the LKM 528 and sends the shared key to the LKM 528 on the storage array 504 as shown by arrow 704 in FIG. 7. In accordance with one or more embodiments of the present invention, upon receiving the shared key, the LKM 528 may start a shared key rekey timer that is used to limit that amount of time that the shared key may be used before a rekey, or refresh, is required. The amount of time may be based on system policies. Because the different nodes may have different policies, the amount of time indicated by the shared key rekey timer on LKM 528 may be different than the amount of time indicated by the shared key rekey timer on LKM 520. In accordance with one or more embodiments of the present invention, in addition or alternatively to an amount of time, the shared key rekey timer can expire based on a number of data exchanges between the source node and the target node. When the shared key rekey timer expires, the LKM 528 initiates a process to obtain a new shared key from the EKM server 506 as described below in reference to FIG. 15.

In response to the LKM 528 having or obtaining a valid shared key, the LKM 528 generates an SKE SA Init Response message that includes a nonce and security parameter index (SPI) created by the LKM 528 for the secure communication between the channels. The SKE SA Init Response message is sent to HBA 522 as shown by arrow 710 in FIG. 7. The responder (or target) HBA 522 sends the SKE SA Init Response message to the initiator HBA 518 on host 502 as shown by arrow 706 in FIG. 7. In accordance with one or more embodiments of the present invention, the SKE SA Init Response message is sent as clear text (i.e., it is not encrypted).

It is to be understood that the block diagram of FIG. 7 is not intended to indicate that the computing environment 700 is to include all of the components shown in FIG. 7. Rather, the computing environment 700 can include any appropriate fewer or additional components not illustrated in FIG. 7, with some components shown in FIG. 7 combined or the functions performed by one or more components performed by different or several components. For example, there may be one or more additional nodes (e.g., hosts and/or storage arrays). Further, the embodiments described herein with respect to computing environment 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 8:
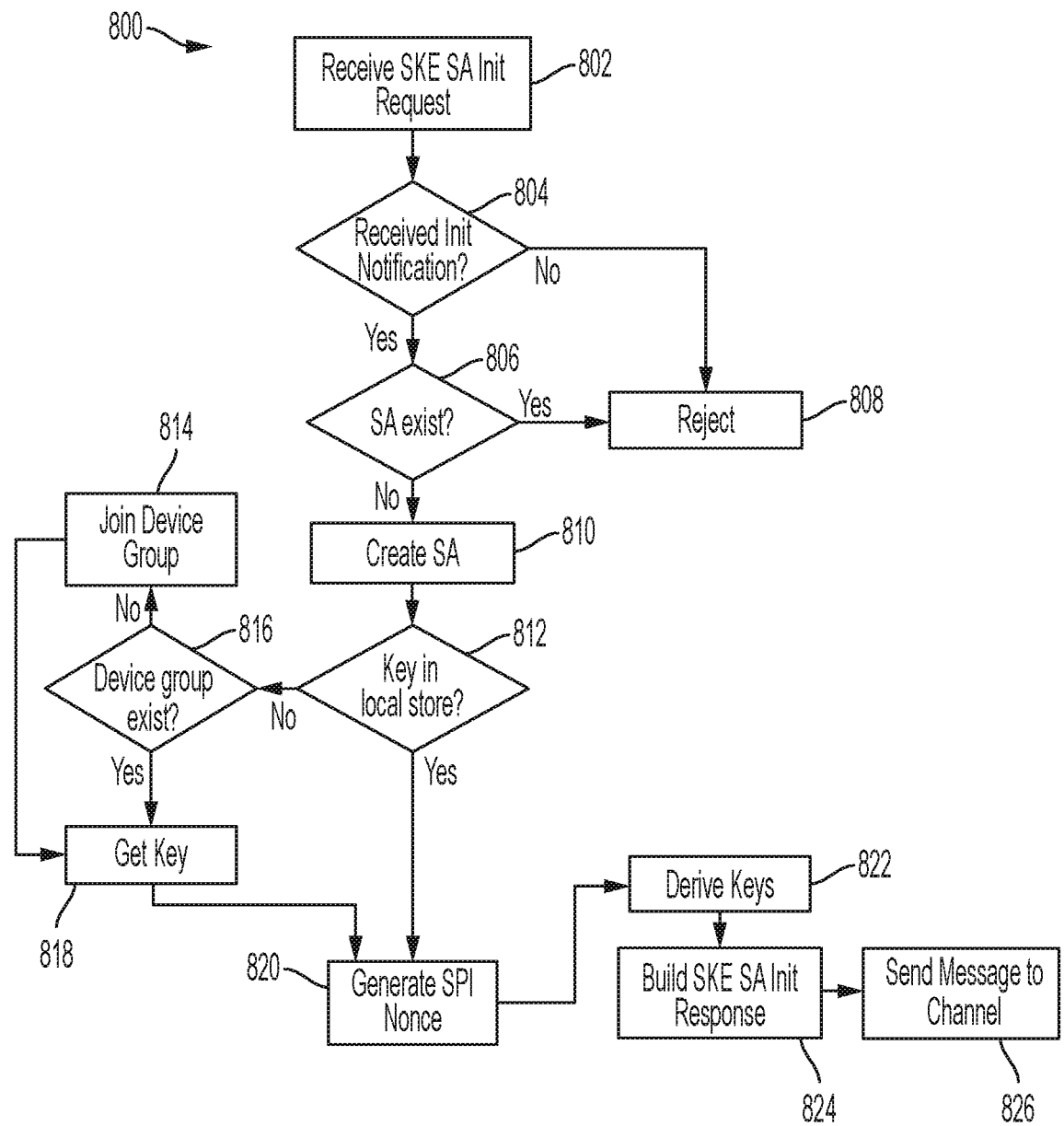
FIG. 8 depicts a process for SKE SA initialization processing and message generation at a node of a target channel according to one or more embodiments of the present invention.

Turning now to FIG. 8, a process 800 for SKE SA initialization processing and message generation at a node of a target channel is generally shown in accordance with one or more embodiments of the present invention. All or a portion of the process 800 can be performed, for example by an LKM such as, LKM 528 of FIG. 7. The process 800 begins at block 802 with the LKM receiving an SKE SA Init Request message requesting the initialization of secure communication between the initiator and responder channels. For example, the initiator channel can be HBA 106 of FIG. 1 and the responder channel can be HBA 114 of FIG. 1. It is determined at block 804 whether the responder HBA has been registered with the LKM on the responder node. If the responder HBA has not been registered with the LKM, processing continues at block 808 with rejecting the request (e.g., because the LKM cannot determine the security capabilities of the responder HBA).

If it is determined, at block 804, that the responder HBA is registered with the LKM, then processing continues at block 806. At block 806, it is determined whether an SA already exists between the node where the initiator channel is located (the initiator node) and the node where the responder channel is located (the responder node). If an SA already exists, then processing continues at block 808 with rejecting the request.

If it is determined, at block 806, that an SA does not already exist between the initiator node and the responder node, then processing continues at block 810 with creating the SA. Once an SA state has been created at block 810 for the initiator node/responder node pair, processing continues at block 812 with determining whether a shared key for the initiator node/responder node pair exists at the responder LKM. If a shared key can be located on the responder LKM for the initiator node/responder node pair, then processing continues at block 820. At block 820, a nonce and an SPI are generated for the responder channel and at block 822 keys that will be used in the encryption and decryption between the initiator channel and the responder channel are derived at the responder node. The keys can be generated using the nonce and SPI of the responder, the nonce and SPI of the initiator, and the shared key.

Key derivation can be based on pseudo random function (PRF) parameters negotiated in a SA payload of an SKE SA Init message exchange established between an initiator and responder. "PRF+" can be a basic operator for generating keys for use in authentication and encryption mode. Key generation can occur over multiple steps. For example, as a first step, a seeding key called "SKEYSEED" can be generated and defined as SKEYSEED=prf(Ni|Nr, Secret_Key), where Ni and Nr are nonces, and the Secret_Key is a shared secret obtained from an EKM, such as EKM server 506. As a second step, a series of seven keys can be generated. For SKE, there can be five keys and two salts, for example, assuming that that SKE SA is protected by a method that requires a salt. A salt is random data that can be used as an additional input to a one-way function that hashes data, a password or passphrase. Salts can be generated as part of key material. For example, a multiple-byte salt can be used as part of an initialization vector (IV) input to a hash-based message authentication code (HMAC). As a further example, 32-byte keys and 4-byte salts can be generated with:

$$\{SK\_d|SK\_ei|Salt\_ei|SK\_er|Salt\_er|SK\_pi|SK\_pr\}=\text{prf+} \\ (SKEYSEED, Ni|Nr|SPIi|SPIr)$$

Where:

Inputs

Ni, Nr can be 16-byte nonces from respective SKE-_SA_Init messages;

SPIi and SPIr can be 8-byte parent SA SPI values from an SKE Header of respective SKE_SA_Init messages and can be used for authentication;

and outputs

SK_d is another seeding key used to generate the data transfer keys (for the child SA) in the third step;

SK_ei, Salt_ei, SK_er and Salt_er are the keys and salts used to encrypt SKE Auth messages and any subsequent messages under the parent SA; and SK_pi and SK_pr are keys used to generate the Authentication Data for the AUTH payload in the SKE Auth messages.

For authentication only, these are all of the keys that may be needed. For encryption of user data, the third step generates the data transfer keys and salts. The third step can derive keys and salts for a child SA, starting with a new recursive invocation of the PRF.

At block 824, an SKE_SA_Init Response message that includes an identifier of the shared key as well as the nonce and SPI created by the LKM at the responder node for the secure communication between the channels is built by the LKM at the responder node. At block 826, the SKE_SA_Init Response message is sent to the responder channel and the responder channel sends the SKE_SA_Init Response message to the initiator channel on the initiator node via, for example, a SAN network.

If it is determined at block 812 that a shared key does not exist for the initiator node/responder node pair, then processing continues at block 816. At block 816, it is determined whether a device group exists for the initiator node/responder node pair. Determining whether the device group exists can include the LKM asking the EKM if a device group exists for the initiator node/responder node pair, and the EKM responding with an identifier of the corresponding shared key if the device group does exist or responding with an error message if it does not. If it is determined that the device group does exist, processing continues at block 818 with obtaining the shared key from the EKM for the initiator node/responder node pair and processing continues at block 820 with generating a responder SPI and nonce. In accordance with one or more embodiments of the present invention, the shared key and shared key identifier are stored in volatile memory at the responder node so that the shared key is not saved when the responder node is powered off or restarted.

If it is determined at block 816 that a device group does not exist on the responder LKM for the initiator node/responder node pair, block 814 is performed and the initiator node/requestor node pair joins a device group. Processing continues at block 818.

The process flow diagram of FIG. 8 is not intended to indicate that the operations of the process 800 are to be executed in any particular order, or that all of the operations of the process 800 are to be included in every case. Additionally, the process 800 can include any suitable number of additional operations.

Figure 9:
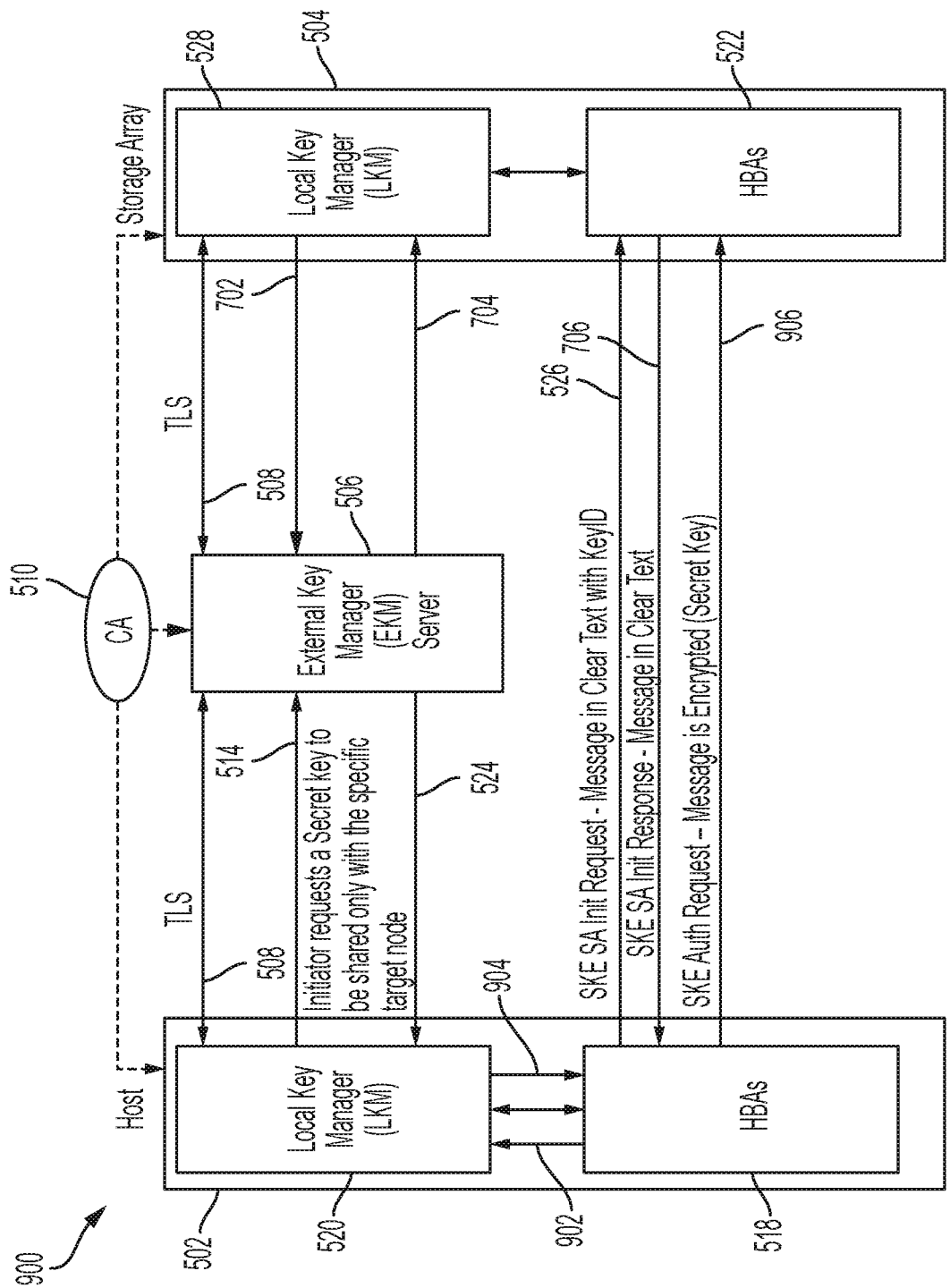
FIG. 9 depicts a block diagram of a computing environment for generating an SKE authentication request based on an SKE SA initialization response according to one or more embodiments of the present invention.

FIG. 9 depicts a block diagram of a computing environment 900 for generating an SKE authentication request (also referred to herein as an "SKE Auth Request") based on an SKE SA initialization response according to one or more embodiments of the present invention. The computing environment 900 shown in FIG. 9 is similar to the computing environment 500, 700 shown in FIGS. 5 and 7 with the addition of building an SKE Auth Request message at the host 502 for the storage array 504.

As shown by arrow 526 of FIG. 9, the HBA 518 on host 502 transmits an SKE SA Init Request message to HBA 522 on storage array 504. As shown by arrow 706 of FIG. 9, the HBA 522 on storage array 504 sends an SKE SA Init Response message, which is received by the HBA 518 on host 502. In response to receiving the SKE SA Init Response message, the HBA 518 sends the SKE SA Init Response message to the LKM 520 located on the host 502 (as shown in by arrow 902 of FIG. 9). In response to receiving the message, the LKM 520 on the host 502 verifies the SKE SA Init Response message and confirms that the device group of the initiator node and responder node forms a valid SA pair. The LKM 520 on the host 502 derives a set of cryptographic keys and builds an SKE Auth Request message. The set of cryptographic keys can be derived, for example, using a process as previously described. The SKE Auth Request message can include a proposal list based on security capabilities supported by the HBA 518 to assist in selecting an encryption algorithm that is also supported through HBA 522 on storage array 504. The payload of the SKE Auth Request message can be encrypted using a different encryption standard that need not be the same as the encryption algorithm selected based on the proposal list. In some embodiments where encryption is not directly supported by the HBA 518 or HBA 522, an option in the proposal list may be no encryption—authenticate only. The SKE Auth Request message is sent to the HBA 518, or channel, that requested that data be sent to the HBA 522 on storage array 504. This in shown by arrow 904 in FIG. 9. The requesting (or initiator) HBA 518 sends the SKE Auth Request message, via a SAN network for example, to the target HBA 522 on storage array 504 as shown by arrow 906 in FIG. 9.

It is to be understood that the block diagram of FIG. 9 is not intended to indicate that the computing environment 900 is to include all of the components shown in FIG. 9. Rather, the computing environment 900 can include any appropriate fewer or additional components not illustrated in FIG. 9, with some components shown in FIG. 9 combined or the functions performed by one or more components performed by different or several components. For example, there may be one or more additional nodes (e.g., hosts and/or storage arrays). Further, the embodiments described herein with respect to computing environment 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 10:
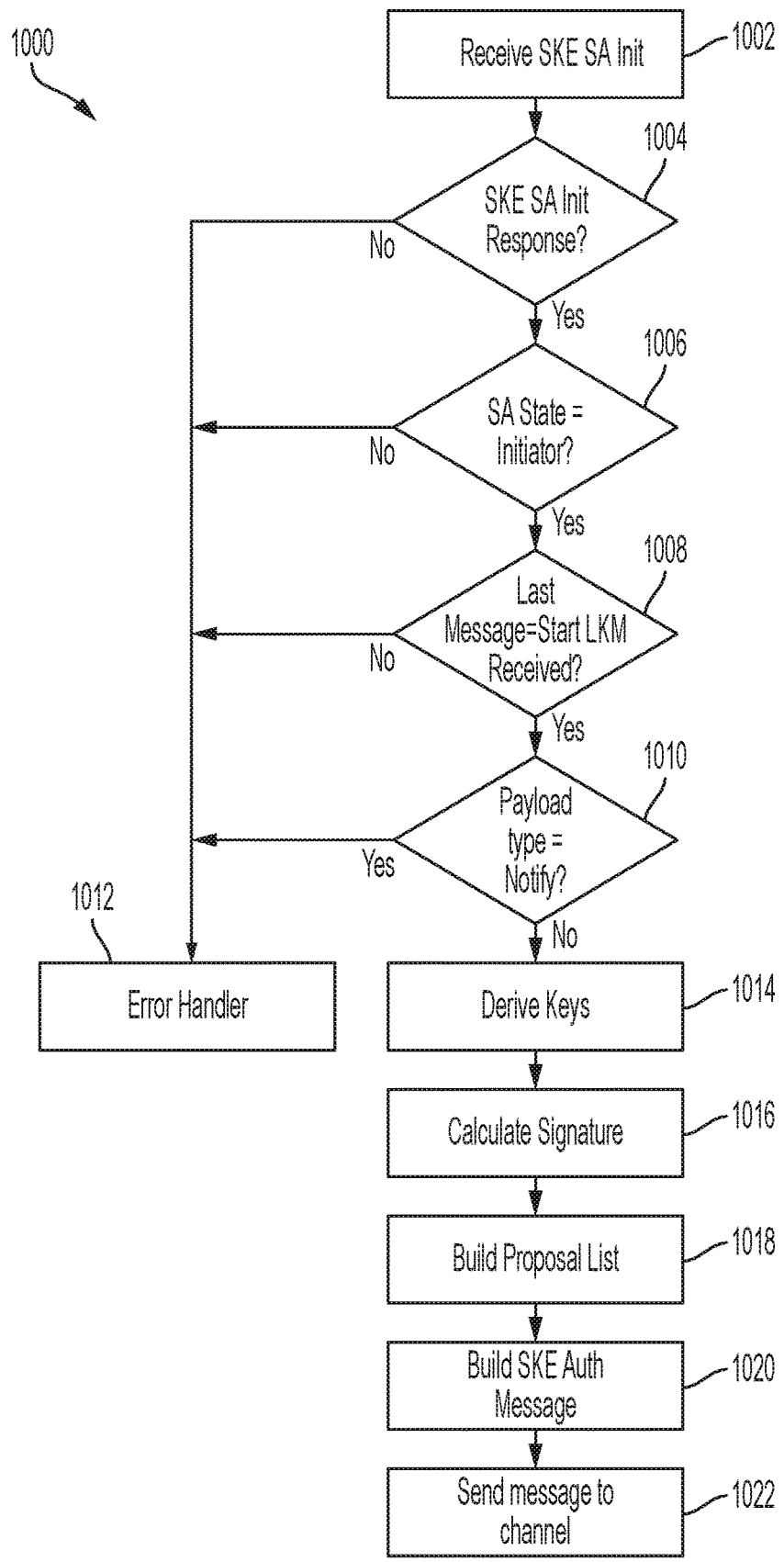
FIG. 10 depicts a process for generating an SKE authentication request based on an SKE SA initialization response according to one or more embodiments of the present invention.

Turning now to FIG. 10, a process 1000 for generating an SKE authentication request is generally shown in accordance with one or more embodiments of the present invention. All or a portion of the process 1000 can be performed, for example by an LKM such as, LKM 520 of FIG. 9. The process 1000 begins at block 1002 with the LKM receiving an SKE SA Init message. At block 1004, the LKM can determine whether the SKE SA Init message is an SKE SA Init Response message, and if so, the process 1000 proceeds to block 1006. At block 1006, the LKM can check the SA state to determine whether the channel is an initiator. In some embodiments, the channel, such as HBA 518, may communicate with itself in a loopback mode of operation, where the initiator node is also the responder node. Loopback mode can be used for testing and/or as a special FICON mode of operation with the SA mode set to both initiator and responder. If the SA state is an initiator, then at block 1008, the LKM can perform a message sequencing check to verify that the last message received at an SA state machine associated with the initiator node and responder node pair was a Start LKM message. At block 1010, based on confirming that the last message received was a Start LKM message, and thus not an unexpected message sequence, the LKM can check a payload type of the SKE SA Init Response message to determine whether a payload type of the SKE SA Init Response message is a Notify message type. A Notify message type can indicate a fault or other condition at the responder node that prevents further progress in the authentication sequence. For example, the LKM of the responder node, such as LKM 528, may have a communication error, a key access error, a sequencing error, or other such condition.

If the SKE SA Init message is not an SKE SA Init Response message as a verification result at block 1004, an error handler 1012 can be invoked. The error handler 1012 can also be invoked if the SA state is a non-compliant SA state at block 1006, an unexpected message sequence is detected at block 1008, or if the payload type is the Notify message type at block 1010. The error handler 1012 may reject the SKE SA Init message received at block 1002 and support a retry sequence as part of a recovery process in case the error condition was a temporary condition. Under some conditions, such as a shared key error or security association error, the error handler 1012 may perform a recovery process that reinitializes the communication sequence, for instance, by making a new request to the EKM server 506 for a shared key between the initiator node and the responder node. Where a retry fails or under conditions where a retry is not performed, resources reserved to support the communication sequence are released.

After confirming that the SKE SA Init Response message is not a Notify message type at block 1010, the process 1000 advances to block 1014. At block 1014, the LKM can derive a set of cryptographic keys based on an SA payload of the SKE SA Init Response message. Key derivation can be performed, for example, using the steps as previously described in reference to process 800 of FIG. 8. At block 1016, the LKM can compute an initiator signature based at least in part on one or more parameters extracted from the SKE SA Init Response message. For example, the initiator signature can be based on a responder nonce, a shared key, an initiator identifier, and at least one key from the set of cryptographic keys. For instance, the SKE SA Init Response message may include SPI and nonce values as previously described. The LKM can compute an HMAC based on the inputs, and the responder node may also independently compute the initiator signature as a further authentication of the initiator node.

The initiator channel, such as HBA 518, can report security capabilities to the LKM of the host, which are used by the LKM build to a proposal list based on one or more security capabilities supported by the initiator channel at block 1018. For example, the capabilities can include a list of encryption algorithms supported by the initiator node. The encryption algorithms may be stored as a priority list, for instance, defining preferences based on computational complexity or another metric used to establish preferences. The priority list may change over time to ensure that different encryption algorithms are selected over a period of time to further enhance security. For instance, a PRF can be used to establish the priorities in the proposal list.

At block 1020, the LKM builds an SKE Auth Request message based at least in part on the set of cryptographic keys and the proposal list, where one or more of the cryptographic keys are used to compute the initiator signature that is included with the proposal list in the SKE Auth Request message. The initiator node can encrypt the payload of the SKE Auth Request message using a predetermined encryption algorithm. At block 1022, the LKM sends the SKE Auth Request message with encrypted payload to the initiator channel, which transmits the SKE Auth Request message to the responder channel of the responder node.

The process flow diagram of FIG. 10 is not intended to indicate that the operations of the process 1000 are to be executed in any particular order, or that all of the operations of the process 1000 are to be included in every case. Additionally, the process 1000 can include any suitable number of additional operations.

Figure 11:
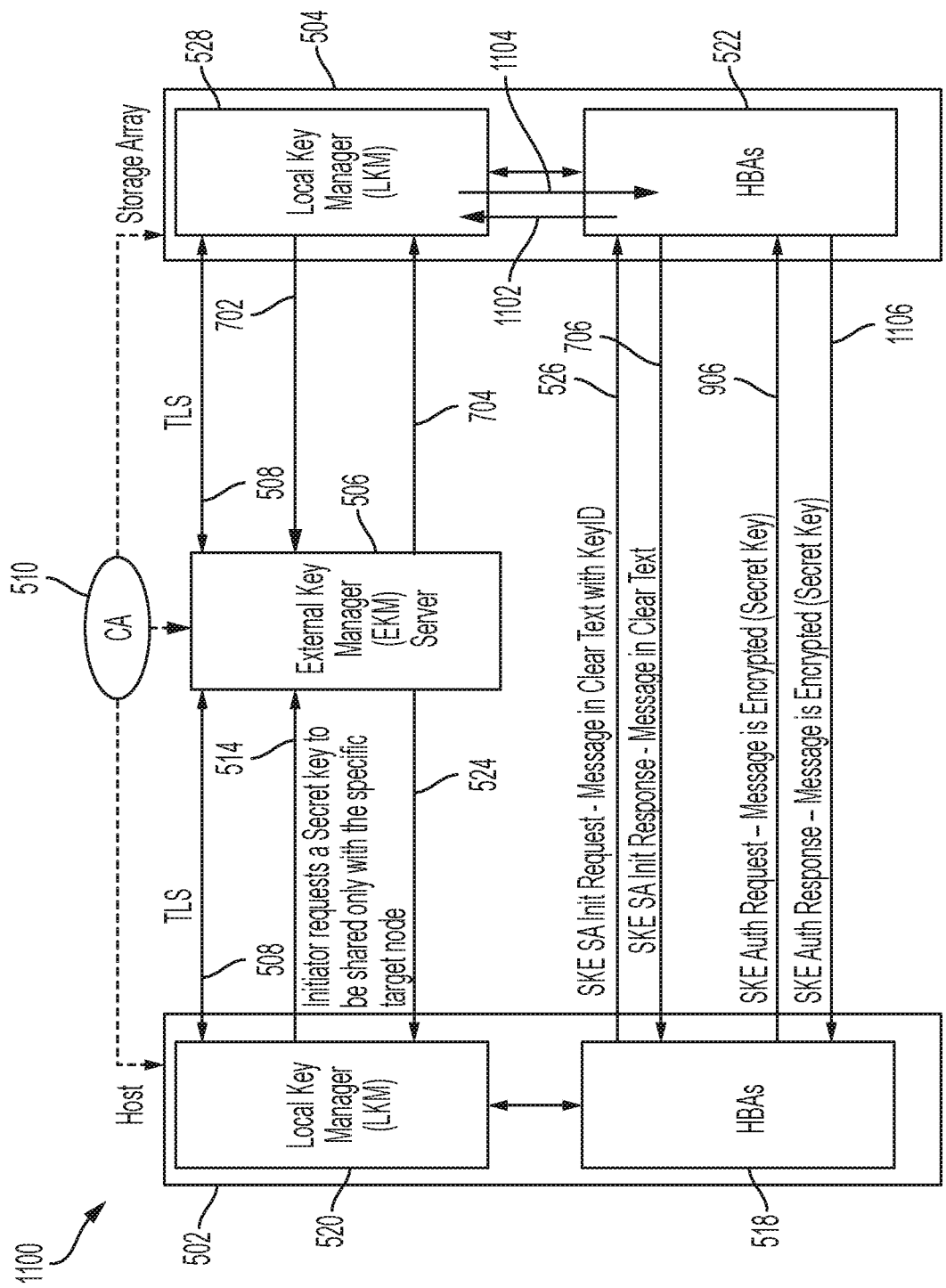
FIG. 11 depicts a block diagram of a computing environment for SKE authentication message processing according to one or more embodiments of the present invention.

FIG. 11 depicts a block diagram of a computing environment 1100 for generating an SKE authentication response (also referred to herein as an "SKE Auth Response") based on an SKE authentication request according to one or more embodiments of the present invention. The computing environment 1100 shown in FIG. 11 is similar to the computing environment 500, 700, 900 shown in FIGS. 5, 7 and 9 with the addition of building an SKE Auth Response message at the storage array 504 for the host 502.

As shown by arrow 526 of FIG. 11, the HBA 518 on host 502 transmits an SKE SA Init Request message to HBA 522 on storage array 504. As shown by arrow 706 of FIG. 11, the HBA 522 on storage array 504 sends an SKE SA Init Response message, which is received by the HBA 518 on host 502. In response to receiving the SKE SA Init Response message, the host 502 sends an SKE Auth Request message (arrow 906) to the storage array 504. In response to receiving the SKE Auth Request message, the HBA 522 sends the SKE Auth Request message to the LKM 528 located on the storage array 504 (as shown in by arrow 1102 of FIG. 11). In response to receiving the message, the LKM 528 on the storage array 504 verifies the SKE Auth Request message and confirms that the device group of the initiator node and responder node forms a valid SA pair along with other expected state and sequence values. The LKM 528 decrypts the payload of the SKE Auth Request message and performs validation checks. The LKM 528 can perform a signature check to further authenticate the initiator node. The SKE Auth Request message can include a proposal list based on security capabilities supported by the HBA 518 to assist in selecting an encryption algorithm that is also supported through HBA 522 on storage array 504. The payload of the SKE Auth Request message can be encrypted using a different encryption standard that need not be the same as the encryption algorithm selected based on the proposal list. Once an encryption algorithm is selected from the proposal list that is compatible with the HBA 522, the LKM 528 can build an SKE Auth Response message that identifies the selected encryption algorithm and encrypts the payload, for instance, using the same encryption algorithm that was used to encrypt the payload of the SKE Auth Request message.

The SKE Auth Response message is sent to the HBA 522, or channel. This in shown by arrow 1104 in FIG. 11. The responder HBA 522 on storage array 504 sends the SKE Auth Response message, via a SAN network for example, to the initiator HBA 518 on the host 502 as shown by arrow 1106 in FIG. 11.

It is to be understood that the block diagram of FIG. 11 is not intended to indicate that the computing environment 1100 is to include all of the components shown in FIG. 11. Rather, the computing environment 1100 can include any appropriate fewer or additional components not illustrated in FIG. 11, with some components shown in FIG. 11 combined or the functions performed by one or more components performed by different or several components. For example, there may be one or more additional nodes (e.g., hosts and/or storage arrays). Further, the embodiments described herein with respect to computing environment 1100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 12:
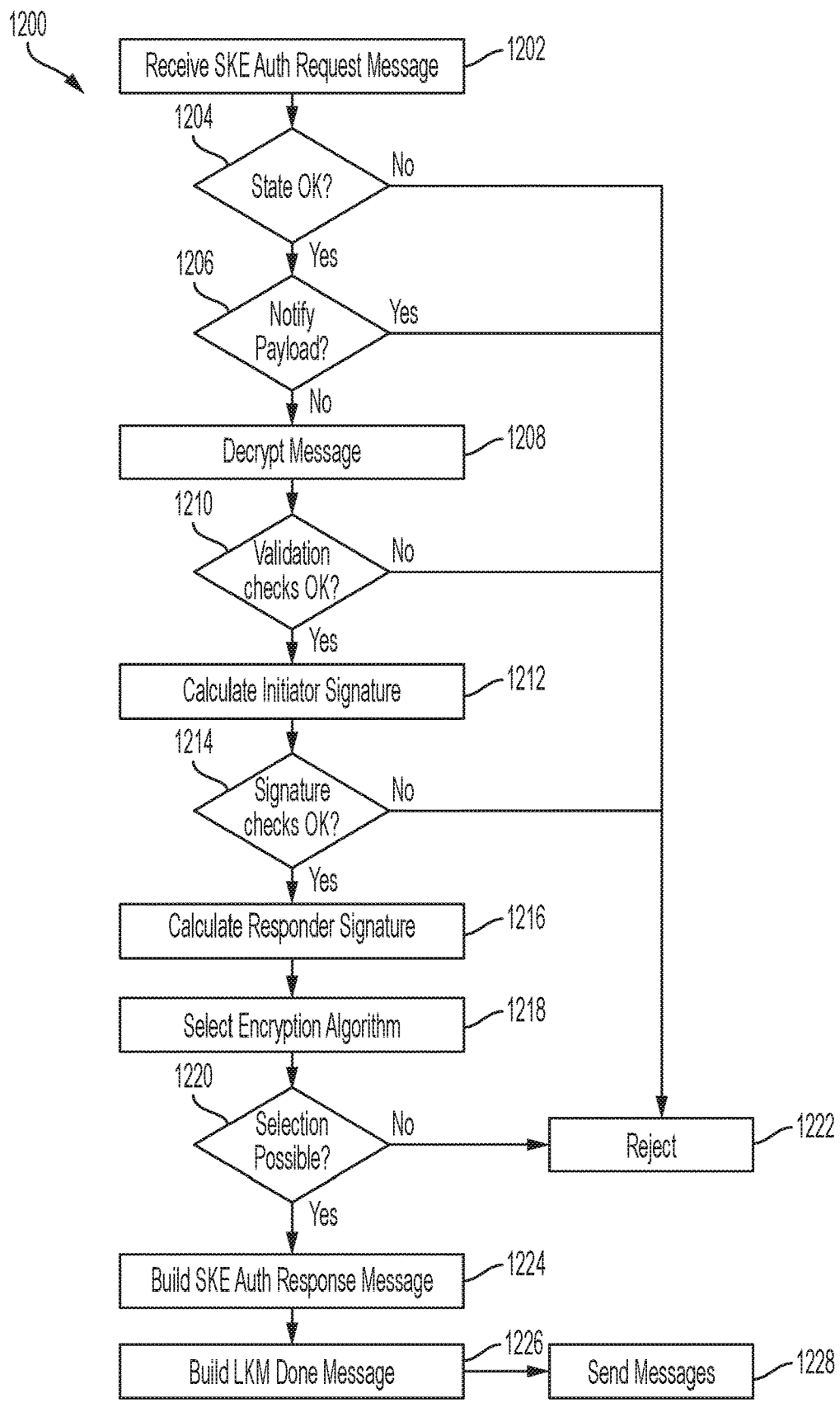
FIG. 12 depicts a process for SKE authentication message processing according to one or more other embodiments of the present invention.

FIG. 12 depicts a process 1200 for SKE authentication message processing according to one or more embodiments of the present invention. All or a portion of the process 1200 can be performed, for example by an LKM such as, LKM 528 of FIG. 11. The process 1200 begins at block 1202 with the LKM receiving an SKE Auth message. The LKM can determine whether the SKE Auth message is an SKE Auth Request message as a validation check, where the LKM may support both SKE Auth Request and Response message types.

At block 1204, a state check can be performed based on an SA of the initiator node and the responder node. Examples of state checks can include confirming that the SA exists for initiator node and responder node pair with a shared key. An SA mode check can confirm that the mode of the SA is set to Responder. The state check at block 1204 may also include verifying that a last received message state and a last sent message state of the LKM 528 match expected values. For example, a message sequence state machine can be checked to confirm that the last message sent from the responder node was an SKE SA Init Response message and the last message received was an SKE SA Init Request message.

If the state is ok (e.g., all expected values are verified) at block 1204, then the payload type of the SKE Auth Request message can be checked at block 1206 to determine whether the message is a Notify message type. A Notify message type can indicate a fault or other condition at the initiator node that prevents further progress in the authentication sequence. For example, the LKM of the initiator node, such as LKM 520, may have a communication error, a key access error, a sequencing error, or other such condition. The Notify message type indicator can appear unencrypted within the payload of the SKE Auth Request message.

If the message payload is not a Notify message type at block 1206, then the message payload can be decrypted at block 1208. After decryption, further validation checks can be performed at block 1210. Validation checks of the SKE Auth Request message can include, for example, checking one or more message header parameters and an identifier of the payload based on decrypting the payload. Parameters that can be checked in the message header may include a version and a payload length. The decrypted payload of the SKE Auth Request message can be checked to confirm that a world-wide node name or world-wide port name identified in the message matches an expected value based on the SKE SA Init Request message.

The LKM 528 can compute an initiator signature at block 1212, and the initiator signature can be checked at block 1214. The initiator signature can be computed based on previously determined values or values extracted from a previous message, such as the SKE SA Init Request message. For example, the initiator signature can be computed at LKM 528 based on a responder nonce, a shared key, an initiator identifier, and at least one key from the set of cryptographic keys. The computed initiator signature can be compared to the initiator signature received in the SKE Auth Request message, where the initiator signature may be extracted from the payload of the SKE Auth Request message after decryption as a further validation.

If the initiator signature check passes at block 1214, a responder signature can be computed at block 1216. The responder signature can be computed based on an initiator nonce, a shared key, a responder identifier, and at least one key from a set of cryptographic keys. One or more values used in computing the responder signature may be based on values extracted from a previous message, such as the SKE SA Init Request message.

At block 1218, an encryption algorithm is selected for encrypting data between the initiator channel and the responder channel based on a proposal list received in the SKE Auth Request message and capabilities of the highest priority encryption algorithm that is supported by the responder node. The capabilities of the HBA 522 can be reported to the LKM 528 to assist the LKM 528 in selecting an encryption algorithm from the proposal list that will be supported by the initiator node and the responder node. If it is determined at block 1220 that an algorithm selection is not possible, where the responder node supports none of the encryption algorithms from the proposal list, then the SKE Auth Request message is rejected at block 1222. The SKE Auth Request message can also be rejected at block 1222 based on an unexpected state at block 1204, a Notify message type detected at block 1206, a validation check failure at block 1210, or a signature check failure at block 1214. Rejection of the SKE Auth Request message can support a retry option, where the responder node is prepared to accept a replacement SKE Auth Request message. There may be a predetermined number of retries supported before the communication session is canceled and associated values are purged.

If an encryption algorithm selection is possible at block 1220, then LKM 528 builds an SKE Auth Response message at block 1224. Building of the SKE Auth Response message can be based at least in part on a successful state check, a successful validation, and selecting one of the encryption algorithms from the proposal list. The payload of the SKE Auth Response message can include the responder signature as computed in block 1216 and an indicator of the selected encryption algorithm based on the selection at block 1218. The payload of the SKE Auth Response message is encrypted, for example, using the same encryption algorithm as used for encrypting the payload of the SKE Auth Request message. The SKE Auth Response message is encrypted independent of the proposal list.

An LKM Done message is built at block 1226. The LKM Done message can include one or more session keys, an initiator SPI, and a responder SPI to enable encrypted communication between the initiator channel and responder channel using the selected encryption algorithm. The session keys, also referred to as data transfer keys, can be computed based on the selected encryption algorithm and one or more of the set of cryptographic keys previously derived as seeding keys. The session keys can support encryption and decryption of data transfers between the initiator channel and responder channel in combination with knowledge of the selected encryption algorithm by both the initiator node and the responder node. The LKM Done message may also set the SA state to complete and may trigger further cleanup actions associated with the authentication process. In addition, a session key rekey timer may be started. The session key rekey timer can trigger a rekey process as described below with respect to FIG. 15. The session key rekey timer can expire based on one or both of an amount of time expiring and a number of exchanges occurring between the target node and the source node.

The SKE Auth Response message and the LKM Done message are sent from the LKM 528 to the HBA 522 at block 1228. After the HBA 522 transmits the SKE Auth Response message to HBA 518, the LKM Done message can trigger reconfiguring of the HBA 522 to communicate with the HBA 518 using the selected encryption algorithm.

The process flow diagram of FIG. 12 is not intended to indicate that the operations of the process 1200 are to be executed in any particular order, or that all of the operations of the process 1200 are to be included in every case. Additionally, the process 1200 can include any suitable number of additional operations.

Figure 13:
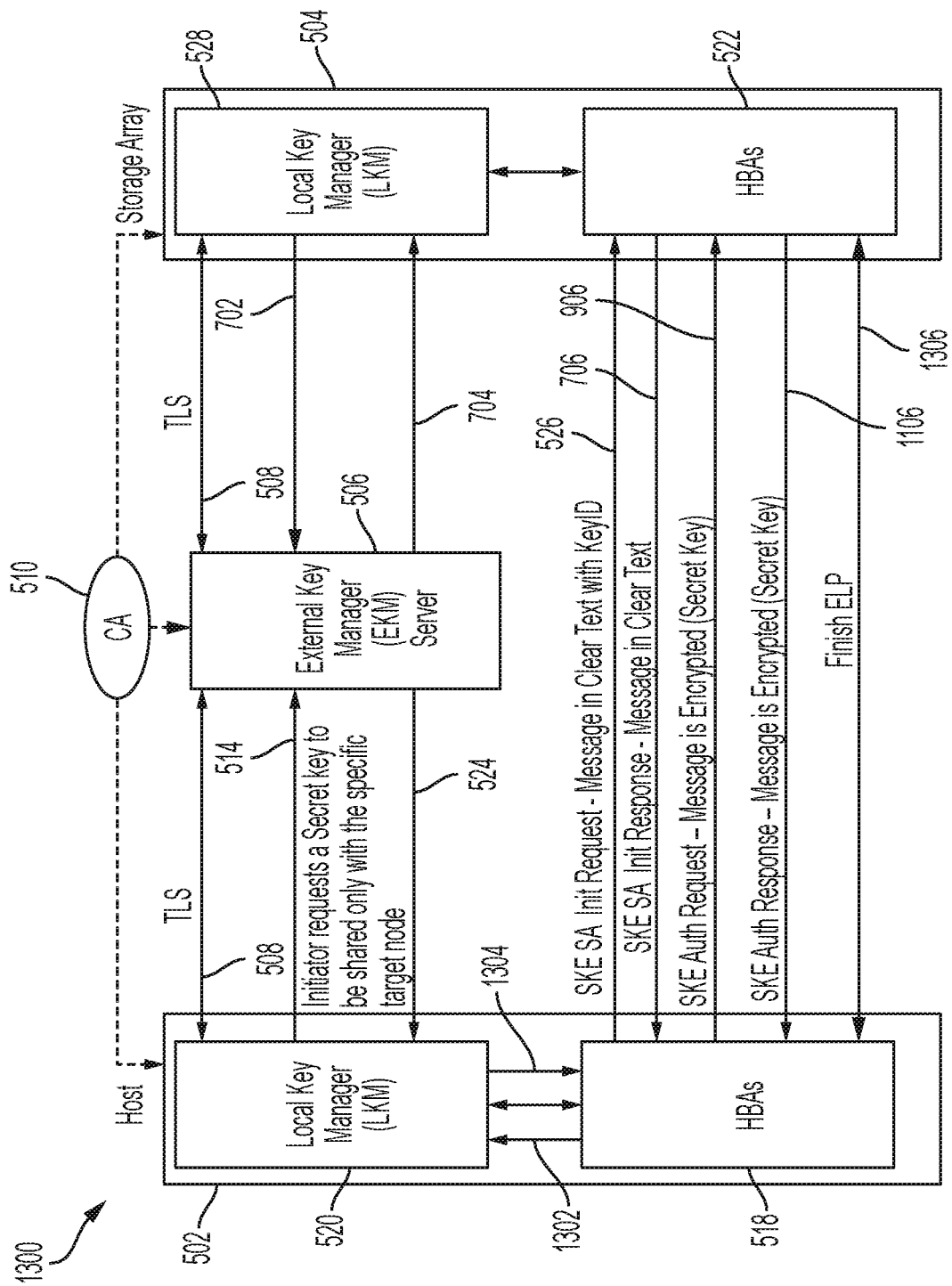
FIG. 13 depicts a block diagram of a computing environment for HBA key loading based on SKE authentication according to one or more embodiments of the present invention.

FIG. 13 depicts a block diagram of a computing environment 1300 for HBA key loading based on an SKE authentication response according to one or more embodiments of the present invention. The computing environment 1300 shown in FIG. 13 is similar to the computing environment 500, 700, 900, 1100 shown in FIGS. 5, 7, 9 and 11 with the addition of SKE Auth Response message processing at the host 502 to finish establishing an encrypted link path.

As shown by arrow 526 of FIG. 13, the HBA 518 on host 502 transmits an SKE SA Init Request message to HBA 522 on storage array 504. As shown by arrow 706 of FIG. 13, the HBA 522 on storage array 504 sends an SKE SA Init Response message, which is received by the HBA 518 on host 502. In response to receiving the SKE SA Init Response message, the host 502 sends an SKE Auth Request message (arrow 906) to the storage array 504. In response to receiving the SKE Auth Request message, the HBA 522 responds with an SKE Auth Response message (arrow 1106) to the HBA 518.

In response to receiving the SKE Auth Response message, the HBA 518 sends the SKE Auth Response message to the LKM 520 located on the host 502 (as shown in by arrow 1302 of FIG. 13). In response to receiving the message, the LKM 520 on the host 502 verifies that the SKE Auth Response was received and confirms that the device group of the initiator node and responder node forms a valid SA pair along with other expected state and sequence values. The LKM 520 decrypts the payload of the SKE Auth Response message and performs validation checks. The LKM 520 can perform a signature check to further authenticate the responder node. The SKE Auth Response message can include a selected encryption algorithm corresponding to one or the encryption algorithms previously sent in the proposal list of the SKE Auth Request message. In some embodiments, the selected encryption algorithm may be no encryption—authenticate only. The payload of the SKE Auth Response message can be encrypted using a different encryption standard that need not be the same as the encryption algorithm selected based on the proposal list. Once an encryption algorithm is selected from the proposal list that is compatible with the HBA 518 and HBA 522, the LKM 520 can store the selection locally in volatile memory. The LKM 520 can build an LKM Done message that identifies the selected encryption algorithm, session keys, and SPIs to support the HBA 518 in encrypting and decrypting communications with the HBA 522. The LKM Done message can be sent to the HBA 518 as shown by arrow 1304.

The HBA 518 can be configured to communicate with the HBA 522 using the information from the LKM Done message and finish establishing an encrypted link path using the selected encryption algorithm between the HBA 518 and HBA 522 as depicted by arrow 1306.

It is to be understood that the block diagram of FIG. 13 is not intended to indicate that the computing environment 1300 is to include all of the components shown in FIG. 13. Rather, the computing environment 1300 can include any appropriate fewer or additional components not illustrated in FIG. 13, with some components shown in FIG. 13 combined or the functions performed by one or more components performed by different or several components. For example, there may be one or more additional nodes (e.g., hosts and/or storage arrays). Further, the embodiments described herein with respect to computing environment 1300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 14:
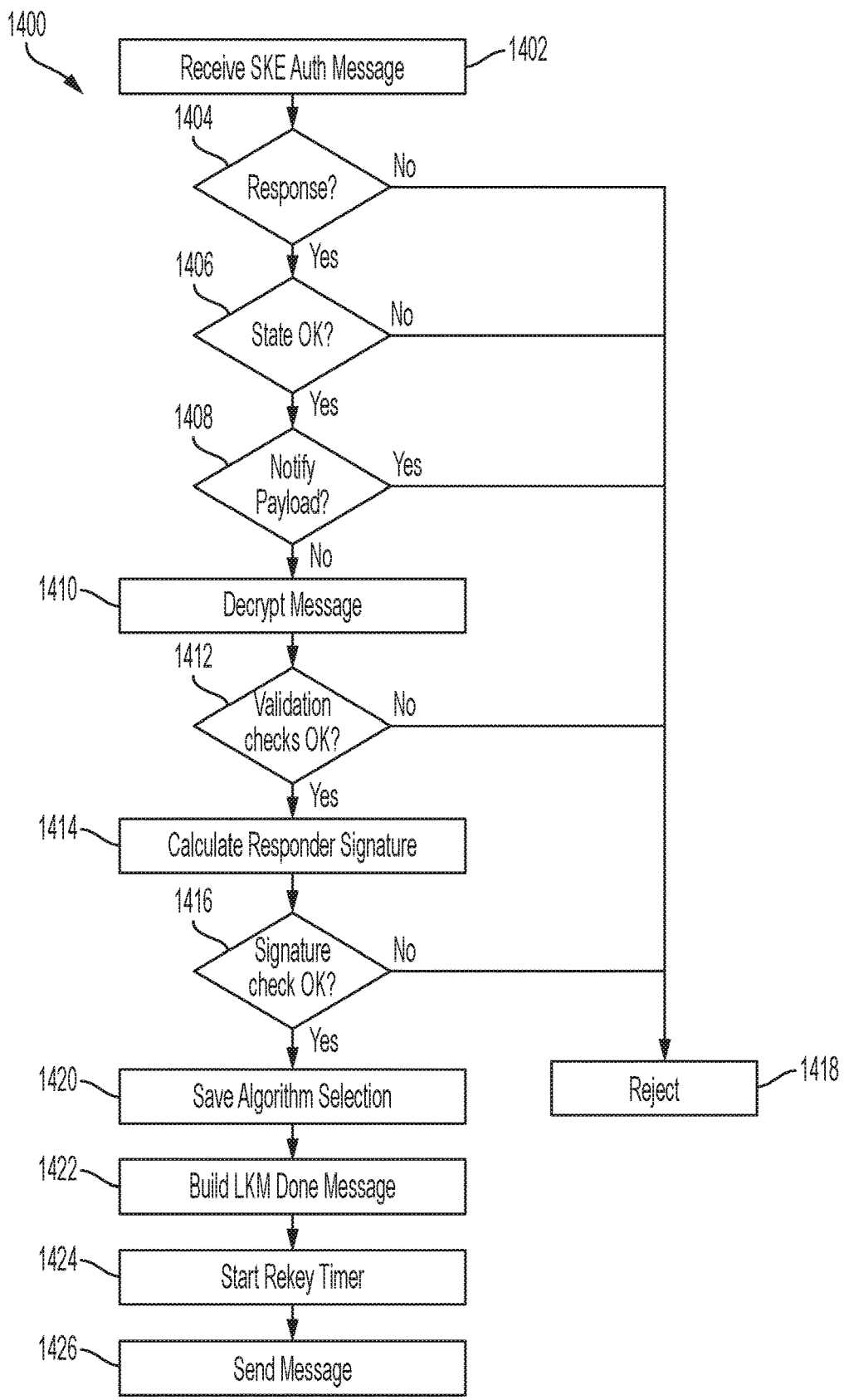
FIG. 14 depicts a process for HBA key loading based on SKE authentication according to one or more embodiments of the present invention.

FIG. 14 depicts a process 1400 for channel key loading of an HBA based on an SKE authentication response according to one or more embodiments of the present invention. All or a portion of the process 1400 can be performed, for example by an LKM such as, LKM 520 of FIG. 13. The process 1400 begins at block 1402 with the LKM receiving an SKE Auth message. At block 1404, the LKM can determine whether the SKE Auth message is an SKE Auth Response message as a validation check, where the LKM may support both SKE Auth Request and Response message types.

After confirming that the SKE Auth Response message was received at block 1404, the process 1400 continues to block 1406. At block 1406, a state check can be performed based on an SA of the initiator node and the responder node. Examples of state checks can include confirming that the SA exists for initiator node and responder node pair with a shared key. An SA mode check can confirm that the mode of the SA is set to Initiator. The state check at block 1406 may also include verifying that a last received message state and a last sent message state of the LKM 520 match expected values. For example, a message sequence state machine can be checked to confirm that the last message sent from the initiator node was an SKE Auth Request message and the last message received was an SKE SA Init Response message.

If the state is okay (e.g., all expected values are verified) at block 1406, then the payload type of the SKE Auth Response message can be checked at block 1408 to determine whether the message is a Notify message type. A Notify message type can indicate a fault or other condition at the initiator node that prevents further progress in the authentication sequence. For example, the LKM of the responder node, such as LKM 528, may have a communication error, a key access error, a sequencing error, or other such condition. The Notify message type indicator can appear unencrypted within the payload of the SKE Auth Response message.

If the message payload is not a Notify message type at block 1408, then the message payload can be decrypted at block 1410. After decryption, further validation checks can be performed at block 1412. Validation checks of the SKE Auth Response message can include, for example, checking one or more message header parameters and an identifier of the payload based on decrypting the payload. Parameters that can be checked in the message header may include a version and a payload length. The decrypted payload of the SKE Auth Response message can be checked to confirm that a world-wide node name or world-wide port name identified in the message matches an expected value based on the Start LKM message.

The LKM 520 can compute a responder signature at block 1414, and the responder signature can be checked at block 1416. The responder signature can be computed based on an initiator nonce, a shared key, a responder identifier, and at least one key from a set of cryptographic keys. One or more values used in computing the responder signature may be based on values extracted from a previous message, such as the SKE SA Init Response message. The computed responder signature can be compared to the responder signature received in the SKE Auth Response message, where the responder signature may be extracted from the payload of the SKE Auth Response message after decryption as a further validation. If the signature check validation fails at block 1416, then the SKE Auth Response message is rejected at block 1418. The SKE Auth Response message can also be rejected at block 1418 based on an unexpected message at block 1404, an unexpected state at block 1406, a Notify message type detected at block 1408, or a validation check failure (e.g., an unsuccessful validation result) at block 1412. Rejection of the SKE Auth Response message can support a retry option, where the initiator node is prepared to accept a replacement SKE Auth Response message. There may be a predetermined number of retries supported before the communication session is canceled and associated values are purged. If the responder signature check passes at block 1416, then the selected encryption algorithm from the SKE Auth Response message is identified and saved at block 1420.

An LKM Done message is built at block 1422. The LKM Done message can include one or more session keys, an initiator SPI, and a responder SPI to enable encrypted communication between the initiator channel and responder channel using the selected encryption algorithm. The session keys, also referred to as data transfer keys, can be computed based on the selected encryption algorithm and one or more of the set of cryptographic keys previously derived as seeding keys. The session keys can support encryption and decryption of data transfers between the initiator channel and responder channel in combination with knowledge of the selected encryption algorithm by both the initiator node and the responder node. The LKM Done message may also set the SA state to complete and may trigger further cleanup actions associated with the authentication process.

At block 1424, a session key rekey timer is started. The session key rekey timer can trigger a rekey process as described below with respect to FIG. 15. The session key rekey timer can expire based on one or both of an amount of time expiring and a number of exchanges occurring between the target node and the source node. Because their corresponding nodes may have different policies, the session key rekey timer at the initiator channel may expire at a different time than the session key rekey timer at the responder channel. At block 1426, the LKM Done message can be sent to the initiator channel after starting the session key rekey timer. Upon receiving the LKM Done message, the HBA 518 can load keys to support encrypted communication with the HBA 522 based on the selected encryption algorithm. Thereafter, data transfers between HBA 518 and HBA 522 are performed using the selected encryption algorithm and session keys until session completion or rekeying.

The process flow diagram of FIG. 14 is not intended to indicate that the operations of the process 1400 are to be executed in any particular order, or that all of the operations of the process 1400 are to be included in every case. Additionally, the process 1400 can include any suitable number of additional operations. In accordance with some embodiments of the present invention, the rekey process is controlled by the initiator side only (e.g., the initiator node, or source node).

Figure 15:
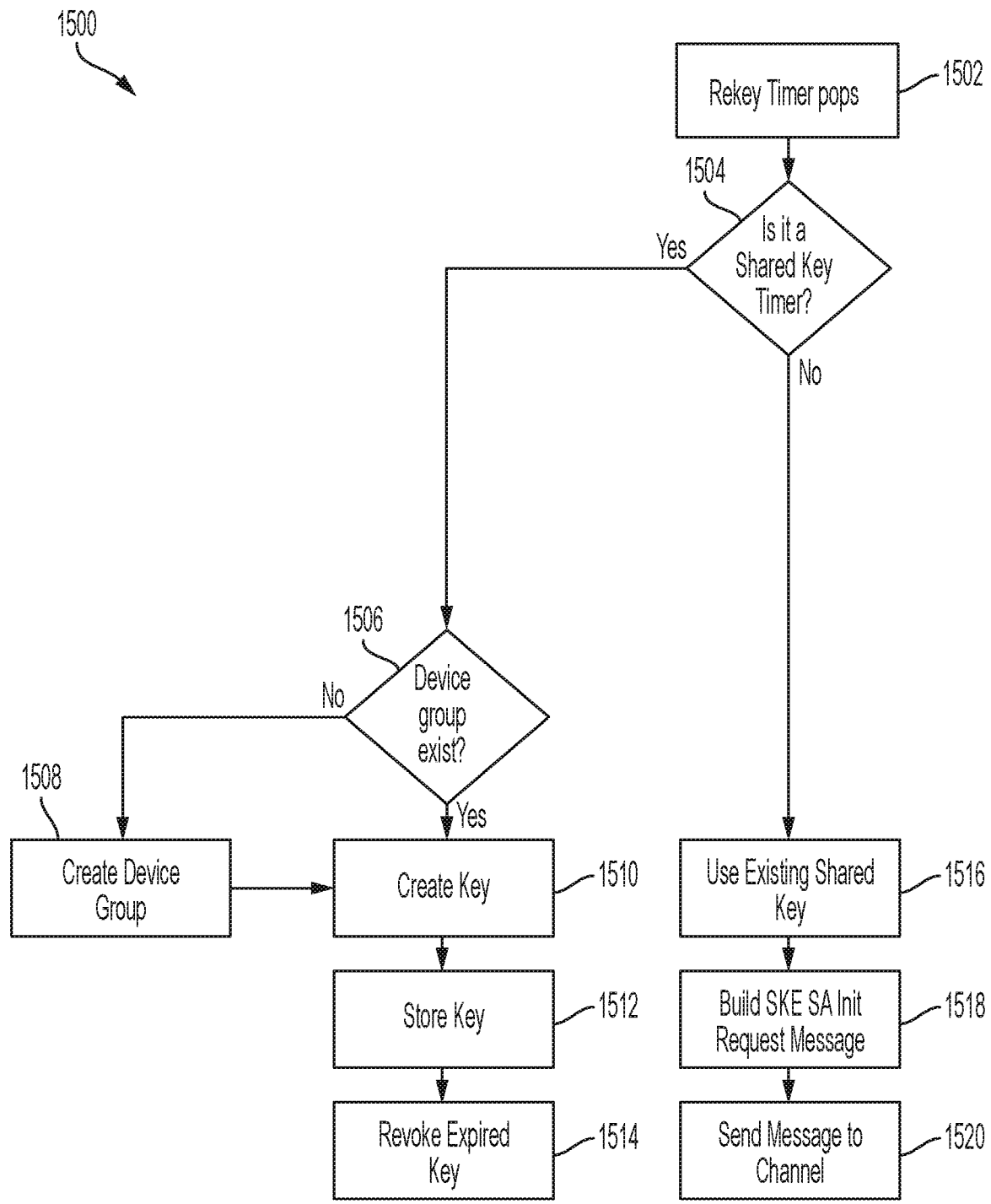
FIG. 15 depicts a process for refreshing keys in a computing environment that uses SKE to provide secure data transfer according to one or more embodiments of the present invention.

Turning now to FIG. 15, a process 1500 for refreshing keys in a computing environment that uses SKE to provide secure data transfer is generally shown in accordance with one or more embodiments of the present invention. All or a portion of the process 1500 can be performed, for example by an LKM such as, LKM 520 or LKM 528 of FIG. 5. As described previously, in accordance with one more embodiment of the present invention shared key rekey timers and session key rekey timers are set based on system policies. In accordance with one or more embodiments of the present invention, the rekey timers are initiated and tracked by LKMs at each of the nodes.

The process 1500 begins at block 1502 with a rekey timer expiring. At block 1504, it is determined whether the rekey timer is the shared key rekey timer or the session key rekey timer. If it is determined, at block 1504, that the shared key rekey timer has expired, then processing continues at block 1506. As described previously, the shared key rekey timer relates to the amount of time that the shared key obtained from an EKM, such as EKM 506 of FIG. 5, remains valid for communication between two nodes, such as host 502 and storage array 504 of FIG. 5. In accordance with one or more embodiments of the present invention, the LKM at each node in the computing environment controls (e.g., initiates and monitors) a separate shared key rekey timer for each of the shared keys that exist between the node and other nodes in the computing environment. Each shared key rekey timer is associated with a device group that includes a pair of nodes (with each pair including the node where the LKM is executing). In addition, the LKM stores the current value of the shared key and the shared key identifier for each of the shared keys that exist between the node and other nodes for secure communication.

At block 1506, it is determined whether a device group exists between the pair of nodes associated with the shared key rekey timer. If it is determined that a device group does not exist, then processing continues at block 1508 with creating a device group between the pair of nodes in a manner such as that described above with respect to FIGS. 5 and 6. Once the device group is created, processing continues at block 1510.

If it is determined at block 1506, that the device group exists between the pair of nodes, then processing continues at block 1510. At block 1510, a new shared key is created. In accordance with one or more embodiments of the present invention, the LKM sends a request to an EKM, such as EKM server 506 of FIG. 5, for a new shared key for the device group that includes the pair of nodes. In response to receiving the request, the EKM creates a new key for the device group and associates the new key with the shared key identifier of the device group. The EKM sends the new key to the requesting LKM. The receiving of the shared key by the LKM may be a multiple step process where subsequent to requesting the updated key from the EKM (or alternatively in response to receiving a notification form the EKM that a new key has been created), the LKM sends a second request that includes the shared key identifier to the EKM to request the current key (i.e., the updated key). The EKM responds by returning the value of the shared key corresponding to the shared key identifier to the requesting LKM. At block 1512, the updated key is stored, as the current shared key, by the LKM. In accordance with one or more embodiments of the present invention, the LKM keeps track of the current communication sessions, or SAs, between channels on the node where the LKM is executing and other channels on other nodes. Each of the current communication sessions continue with the previous shared key, that is the shared key that was used prior to the new shared key being created, until the session ends or a session key rekey timer expires. Once the LKM determines that no more current communication sessions are using the previous shared key, the previous shared key is revoked at block 1514. In accordance with one or more embodiments of the present invention, the LKM stored information about the status of current communication sessions using the SA.

If it is determined, at block 1504, that the session key rekey timer has expired, then processing continues at block 1516. As described previously, the session key rekey timer relates to the amount of time that the session key (which may include several keys) remains valid for a communication session between two channels, such as an HBA 518 and an HBA 522 of FIG. 5. In accordance with one or more embodiments of the present invention, the LKM at each node in the computing environment controls (e.g., initiates and monitors) a separate session key rekey timer for each of the communication sessions that are in process between channels on the node and channels on other nodes in the computing environment. Each session key rekey timer is associated with a pair of channels (with each pair including a channel on the node where the LKM is executing).

At block 1516, the LKM accesses the current shared key associated with the node(s) where the pair of channels that are associated with the expired session key rekey timer are located. At block 1518, the LKM builds an SKE SA Init Request message in a manner such as that described above with respect to FIGS. 5 and 6. At block 1520, the SKE SA Init Request message is sent to the channel on the other node to initiate the renegotiation of the session key(s). In accordance with one or more embodiments of the present invention, the renegotiation includes exchanging the SKE SA Init Request, the SKE SA Init Response, the SKE Auth Request, and the SKE Auth response messages between the pair of channels.

Providing the ability to refresh, or rekey, the keys provides another layer of security to the system. In accordance with some embodiments of the present invention, the shared keys are refreshed less frequently than the session keys.

The process flow diagram of FIG. 15 is not intended to indicate that the operations of the process 1500 are to be executed in any particular order, or that all of the operations of the process 1500 are to be included in every case. Additionally, the process 1500 can include any suitable number of additional operations.

Although various embodiments are described herein, other variations and embodiments are possible.

One or more aspects of the present invention are inextricably tied to computer technology and facilitate processing within a computer, improving performance thereof. In one example, performance enhancement is provided in authenticating links between nodes. These links are used to securely transmit messages between the nodes coupled by the links. One or more aspects reduce link initialization time, increase productivity within the computer environment, enhance security within the computer environment, and/or increase system performance.

Figure 16A:
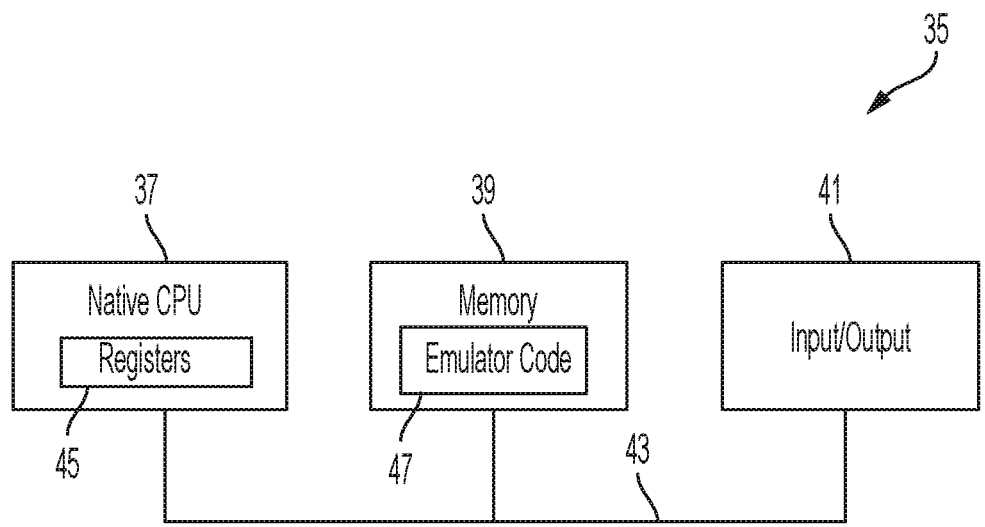
FIG. 16A depicts another example of a computing environment to incorporate and use one or more aspects of the present invention.

Further other types of computing environments may also incorporate and use one or more aspects of the present invention, including, but not limited to, emulation environments, an example of which is described with reference to FIG. 16A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, New York; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 16B:
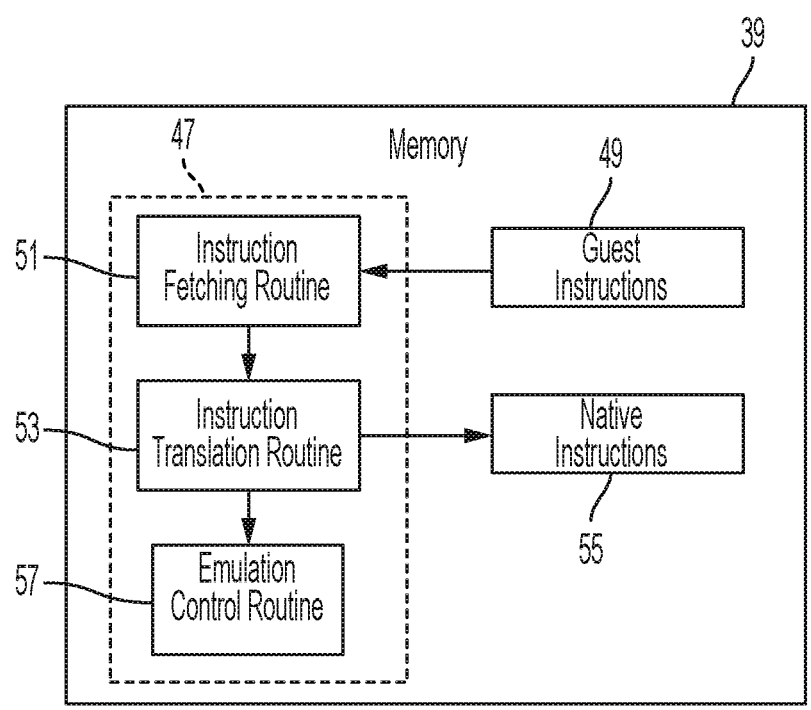
FIG. 16B depicts further details of the memory of FIG. 16A.

Further details relating to emulator code 47 are described with reference to FIG. 16B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
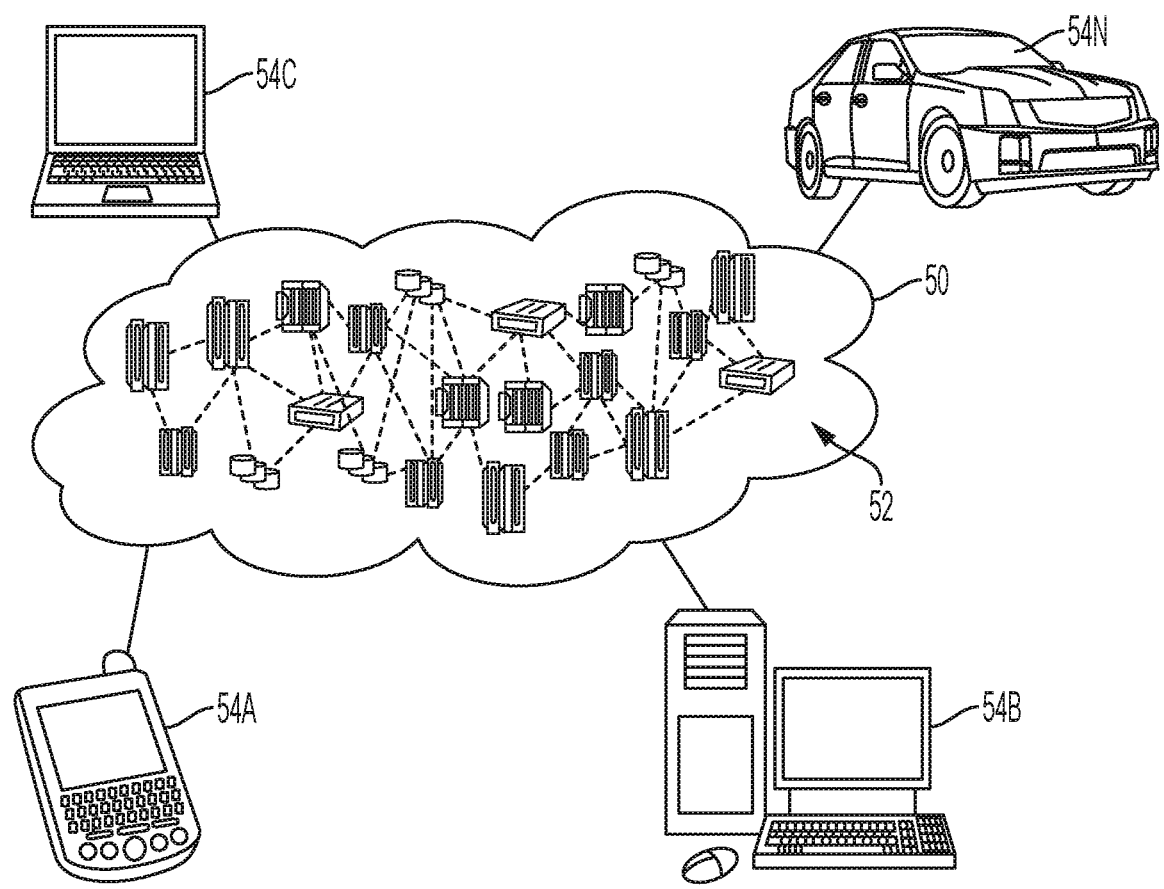
FIG. 17 depicts a cloud computing environment according to one or more embodiments of the present invention.

Referring now to FIG. 17, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 52 and cloud computing environment 50 can communicate with any type of computerized device over any type of network and/or network addressable connection (e.g., using a web browser).

Figure 18:
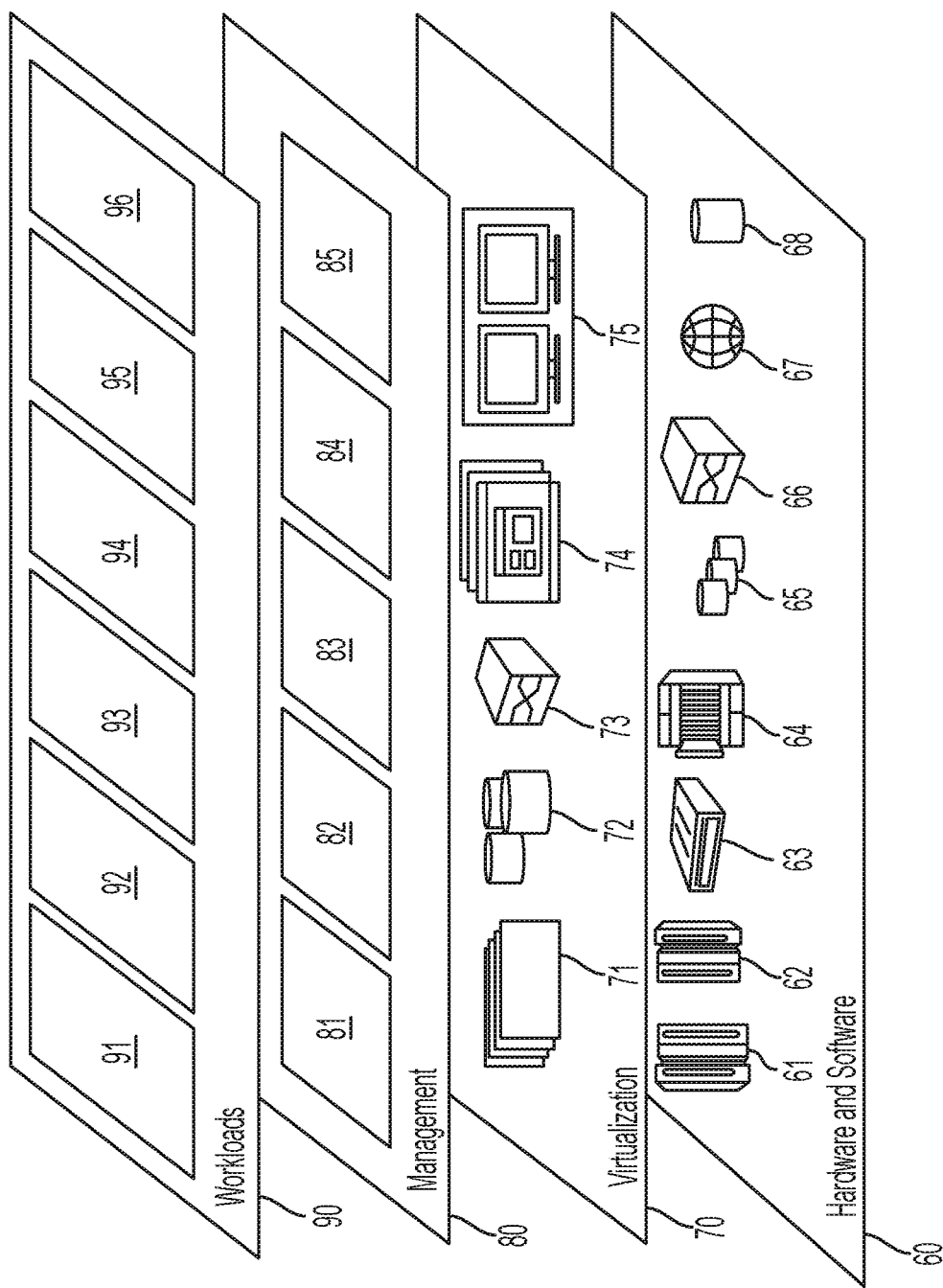
FIG. 18 depicts abstraction model layers according to one or more embodiments of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Moreover, other security protocols, transmission protocols and/or standards may be employed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, the computer program product comprising:
   a computer readable storage medium readable by one or more processing circuits and storing instructions for performing operations comprising:
   receiving an authentication response message at an initiator channel on an initiator node from a responder channel on a responder node to establish a secure communication, the receiving at a local key manager (LKM) executing on the initiator node;
   performing a state check based on a security association of the initiator node and the responder node;
   extracting an identifier of a selected encryption algorithm from the authentication response message; and
   requesting the initiator channel to communicate with the responder channel based at least in part on a successful state check and the selected encryption algorithm.

2. The computer program product of claim 1, wherein communication between the responder channel and the initiator channel is via a storage area network (SAN).

3. The computer program product of claim 1, wherein the operations further comprise:
   computing a responder signature based at least in part on one or more parameters extracted from a previously received initialization message; and
   comparing the responder signature to a signature extracted from the authentication response message as a validation.

4. The computer program product of claim 3, wherein the responder signature is computed based on an initiator nonce, a shared key, a responder identifier, and at least one key from a set of cryptographic keys.

5. The computer program product of claim 1, wherein the operations further comprise decrypting a payload of the authentication response message, and checking one or more message header parameters and an identifier of the payload based on decrypting the payload.

6. The computer program product of claim 1, wherein the state check further comprises verifying a security association state of the initiator node.

7. The computer program product of claim 1, wherein the state check further comprises verifying a last received message state and a last sent message state of the LKM.

8. The computer program product of claim 1, wherein the operations further comprise rejecting the authentication response message based on an unsuccessful validation result or based on determining that the authentication response message comprises a notify type message indicating an error condition at the responder node.

9. The computer program product of claim 1, wherein the LKM executes in a logical partition of a computer system.

10. The computer program product of claim 1, wherein the responder node is a host computer or a storage array.

11. The computer program product of claim 1, wherein the operations further comprise building an LKM Done message comprising one or more session keys, an initiator security parameter index (SPI), and a responder SPI to enable encrypted communication between the initiator channel and responder channel using the selected encryption algorithm.

12. The computer program product of claim 11, wherein the operations further comprise starting a rekey timer that triggers a rekey process with respect to an external key manager.

13. The computer program product of claim 12, wherein the operations further comprise setting a security association state to complete and sending the LKM Done message to the initiator channel after starting the rekey timer.

14. A computer-implemented method of facilitating processing within a computing environment, the computer-implemented method comprising:
- receiving an authentication response message at an initiator channel on an initiator node from a responder channel on a responder node to establish a secure communication, the receiving at a local key manager (LKM) executing on the initiator node;
- performing a state check based on a security association of the initiator node and the responder node; and
- requesting the initiator channel to communicate with the responder channel based at least in part on a successful state check.

15. The computer-implemented method of claim 14, further comprising:
- computing a responder signature based at least in part on one or more parameters extracted from a previously received initialization message, wherein the responder signature is computed based on an initiator nonce, a shared key, a responder identifier, and at least one key from a set of cryptographic keys; and
- comparing the responder signature to a signature extracted from the authentication response message as a validation.

16. The computer-implemented method of claim 14, further comprising:
- decrypting a payload of the authentication response message; and
- checking one or more message header parameters and an identifier of the payload based on decrypting the payload.

17. The computer-implemented method of claim 14, wherein the state check further comprises verifying a security association state of the initiator node, and the state check further comprises verifying a last received message state and a last sent message state of the LKM.

18. The computer-implemented method of claim 14, further comprising:
- building an LKM Done message comprising one or more session keys, an initiator security parameter index (SPI), and a responder SPI to enable encrypted communication between the initiator channel and responder channel using a selected encryption algorithm; and
- starting a rekey timer that triggers a rekey process with respect to an external key manager.

19. A computer system for facilitating processing within a computing environment, the computer system comprising:
- an initiator node; and
- a plurality of channels coupled to the initiator node, wherein the computer system is configured to perform operations comprising:
  - receiving an authentication response message at an initiator channel on the initiator node from a responder channel on a responder node to establish a secure communication, the receiving at a local key manager (LKM) executing on the initiator node;
  - performing a validation of the authentication response message; and
  - requesting the initiator channel to communicate with the responder channel based at least in part on a successful validation.

20. The computer system of claim 19, wherein the initiator node is a host computer and the LKM executes in a logical partition of the host computer, and the responder node is a storage array.

* * * * *